(12) United States Patent
Medvinsky et al.

(10) Patent No.: US 7,551,738 B2
(45) Date of Patent: Jun. 23, 2009

(54) SEPARATION OF COPY PROTECTION RULES

(75) Inventors: Alexander Medvinsky, San Diego, CA (US); Petr Peterka, San Diego, CA (US); Jiang (Jason) Zhang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 930 days.

(21) Appl. No.: 10/933,011

(22) Filed: Sep. 2, 2004

(65) Prior Publication Data

US 2005/0071669 A1 Mar. 31, 2005

Related U.S. Application Data

(63) Continuation-in-part of application No. 10/672,929, filed on Sep. 26, 2003, now abandoned.

(51) Int. Cl.
*H04N 7/167* (2006.01)

(52) U.S. Cl. .................. 380/203; 726/26; 726/27; 726/30; 725/148; 380/201; 380/212

(58) Field of Classification Search .......... 726/26, 726/27, 30; 725/148; 380/201, 203, 212
See application file for complete search history.

(56) References Cited

U.S. PATENT DOCUMENTS

| | | | |
|---|---|---|---|
| 7,051,005 B1* | 5/2006 | Peinado et al. | 713/193 |
| 7,107,448 B1* | 9/2006 | MacKay et al. | 726/26 |
| 7,120,250 B2* | 10/2006 | Candelore | 380/284 |
| 2002/0002543 A1* | 1/2002 | Spooren et al. | 705/57 |
| 2002/0065784 A1* | 5/2002 | Ranzini et al. | 705/64 |
| 2003/0115147 A1* | 6/2003 | Feldman et al. | 705/64 |
| 2004/0003251 A1* | 1/2004 | Narin et al. | 713/172 |
| 2004/0049694 A1* | 3/2004 | Candelore | 713/189 |
| 2004/0168056 A1* | 8/2004 | Dillaway et al. | 713/156 |
| 2004/0221302 A1* | 11/2004 | Ansari et al. | 725/25 |
| 2004/0250273 A1* | 12/2004 | Swix et al. | 725/25 |
| 2005/0071663 A1* | 3/2005 | Medvinsky et al. | 713/200 |
| 2005/0111467 A1* | 5/2005 | Ng et al. | 370/401 |

(Continued)

FOREIGN PATENT DOCUMENTS

WO 03/039155 A 5/2003

OTHER PUBLICATIONS

R. Vevers, C. Hibbert: "Copy Protection and Content Management in the DVB", IBC 2002 Conference papers, Online. Aug. 30, 2003. XP002346022. pp. 3-5, figures1,2. URL: http://www.broadcastpapers.com/whitepapers/ IBCKPMGCopyProtection.pdf?CFID=26407499&CFTOKEN=fc163ee5ff130326-9978E4EA-CEC2-29DE-88902F4DB155EB7F.

(Continued)

*Primary Examiner*—David Garcia Cervetti
(74) *Attorney, Agent, or Firm*—Stewart M. Wiener

(57) ABSTRACT

A copyright protection method and apparatus employ a first protection scheme within a single authorized domain, in which all interfaces are protected with digital rights management system, and employ a second protection scheme for use in inter-domain file transfers. The method and apparatus employ a third protection scheme for external outputs not protected by a digital rights management system.

13 Claims, 20 Drawing Sheets

U.S. PATENT DOCUMENTS

2007/0027814 A1* 2/2007 Tuoriniemi .................. 705/59

OTHER PUBLICATIONS

DVB Technical Module Sub-Group on Copy Protection Technologies. "Call for Proposals for Content Protection & Copy Management Technologies", DVB CPT Revision 1.2. Jul. 5, 2001, XP002230687 p. 4, line 6—p. 6, line 38, Annex 1, items 19, 23, 26. Annex 2, Glossary, items 30, 32, 77-79 URL: http://cryptome.org/dvb-cpcm-cfp.htm.

Van Den Heuvel, S.A.F.A. et al., "Secure Content Management in Authorised Domains" Sep. 15, 2002, International Broadcasting Convention, pp. .467-474, XP002273504 (Broadcastpapers Pty Ltd. ). URL: http://eprints.eemcs.utwente.nl/912/01/IBCPhilipsSecureConyentMx.pdf.

"IBM Response to DVB-CPT Call for Proposals for Content Protection & Copy Management: XCP Cluster Protocol" Oct. 19, 2001. XP001148193. p. 6, line 1-line 9, last line p. 20, lines 9-20. RL: http://web.archive.org/web/20041127064853/www.almaden.ibm.com/software/ds/ContentAssurance/papers/xCP_DVB.pdf.

* cited by examiner

SEPARATION OF COPY PROTECTION RULES

STATEMENT OF RELATED APPLICATION

This application is a continuation-in-part, and claims the benefit of priority to, U.S. patent application Ser. No. 10/672,929, filed Sep. 26, 2003 now abandoned, the entire specification of which is incorporated by reference herein.

FIELD OF THE INVENTION

The present invention relates generally to methods and apparatuses for communicating copyright protected content, and more particularly to a method and apparatus for communicating copyright protected content in a secure or protected manner.

BACKGROUND

Copy protection rules, such as those defined by SMPTE ExCCI, generally do not take into account the existence of an authorized domain, in which devices owned by a single user can securely exchange content. Existing copy protection standards include states, such as "COPY ONE GENERATION," "COPY NO MORE" and "COPY FREE," which make sense when content is sent over an external unprotected interface, but would make a user's life very difficult when trying to apply these states to content that is shared by multiple devices in his authorized domain.

More user-friendly copy protection rules are needed for content when it is copied or moved inside a protected authorized domain. But the traditional (ExCCI-like) copy protection states still need to be defined for external interfaces that are still commonly used to communicate with off-the-shelf display devices (e.g., digital TV or computer monitor).

Furthermore, content users should be allowed to legally share content over protected (on-line or removable media) interfaces and this needs to be reflected in the content rights. It is rarely acceptable to allow a user to share pay content with everyone, so it is necessary to be able to specify a list of authorized domains within which content may be shared.

SMPTE ExCCI specification separates copy protection rules into digital and analog but does not address a concept of authorized domain.

Thus, the present invention is therefore directed to the problem of developing an automated method for controlling copyright protected content in a communications system.

SUMMARY OF THE INVENTION

The present invention solves these and other problems by providing a method for establishing and enforcing copy protection rules that permits intra-domain transfers and copying with certain controls.

According to one aspect of the present invention, in an exemplary embodiment of a method for controlling transfers of copyright protected material, separate copy protection rules are established and enforced for intra-domain and intra-domain operations.

In an exemplary embodiment of the above method, copyright protected rules are set forth as follows for intra-domain operations. According to this embodiment, within a single authorized domain where all interfaces are protected with the same Digital Rights Management (DRM) system, the rights specify:

(i) If a copy of the content is allowed to be anywhere within the whole authorized domain or if content may be stored only on one or more specific devices within the local authorized domain; and (ii) When the content is being rendered, how many simultaneous rendering devices are permitted.

In another exemplary embodiment of the above method, copyright protected rules are set forth as follows for inter-domain operations. According to this embodiment, for operations across domains, the rights specify:

(i) If the content may be copied or moved to other domains;
  (1) For moves, the system may optionally allow movement of content to any other domain; and
  (2) For copies, the system must explicitly identify domains to which copies are allowed (Copy to any domain is not allowed, because that would be equivalent to unprotected content); and (ii) A list of specific domains to which content may be copied or moved. During the content transfer to another domain, the content rights must be preserved.

In yet another exemplary embodiment of the above method, copyright protected rules are set forth as follows for operations to external outputs. According to this embodiment, for external outputs not protected by a DRM system, the specify the following copy protection info (separate for analog, digital uncompressed and digital compressed outputs):

(i) CGMS Copy protection state (COPY-ONCE, COPY-NEVER, COPY-NO-MORE or COPY FREE);
(ii) MACROVISION parameters (for analog outputs); and
(iii) If the particular type of output (e.g., analog) is allowed at all. If the particular output type is disabled, that means that both copies and rendering of content is not allowed.

DETAILED DESCRIPTION

Figure 1:
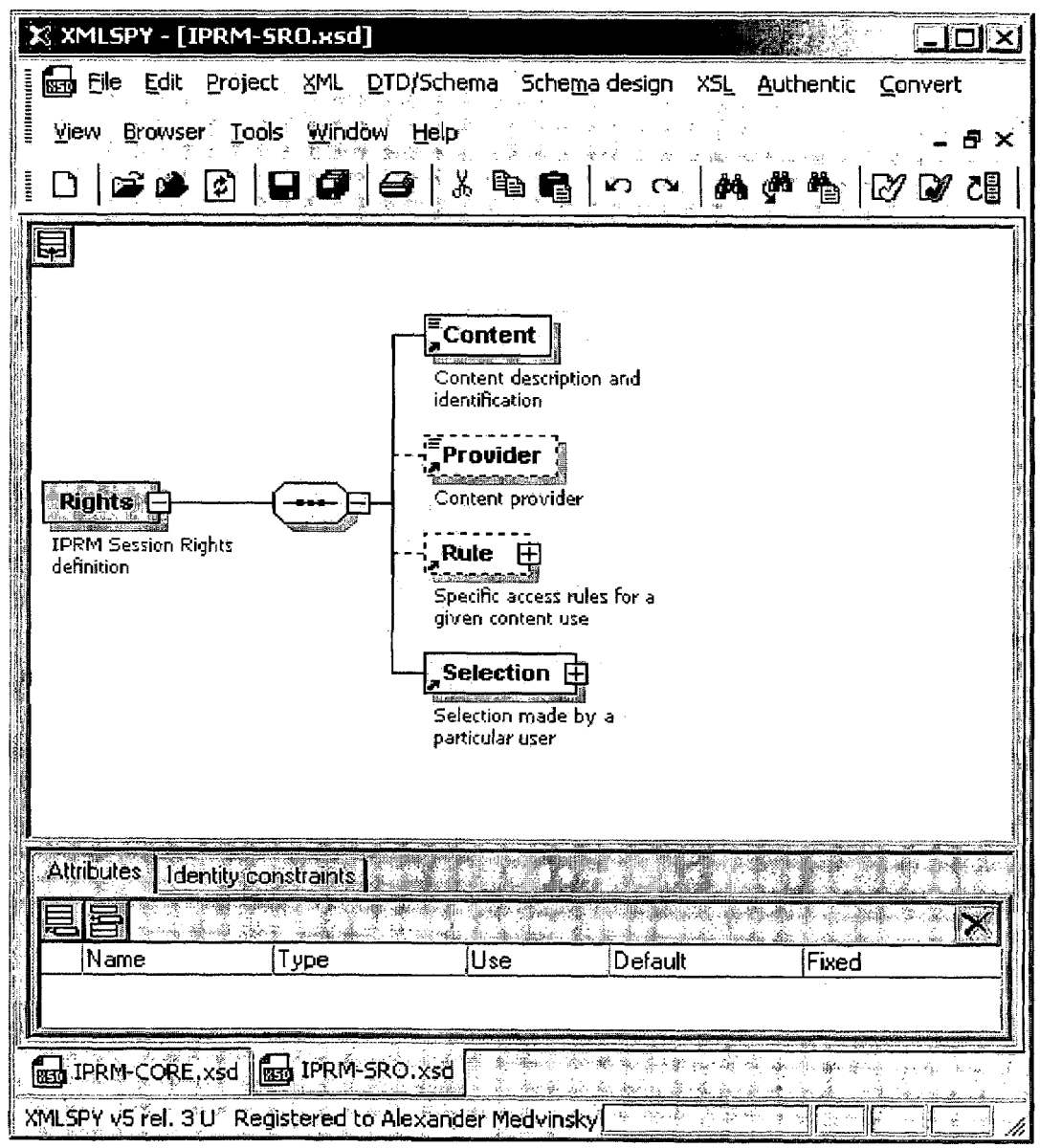
FIG. 1 depicts a Session Rights Element, which is part of an exemplary embodiment of a copyright protection scheme according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In following, the RuleSet element defined in the Persistent Entitlements XML schema has a "deviceBound" Boolean attribute that when true, indicates that the access device that originally received purchased content is not allowed to make any further copies of the content—not even within the same authorized domain. If this attribute is not set, then further copies may be made within the same authorized domain.

The RuleSet also contains a Redistribution element that specifies an additional set of authorized domains or specific devices with which this content may be shared. It also has a Boolean "move" attribute that when true indicates that the content must be moved (but not copied) between domains.

The RuleSet includes AnalogOutput, DigitalCompressed and DigitalUncompressed elements that specify copy protection rules, which apply only when the content is being sent over an external interface that is not protected by a DRM system. When content is being transferred securely within a DRM-protected domain or between multiple DRM-protected domains, these three elements do not apply but must be preserved without any changes to copy protection states.

The above embodiments have applicability to digital rights management, particularly in IP Set-Top products.

The growing interest in streaming distribution of multimedia content over Internet Protocol (IP) networks brings a need for secure delivery of such content to legitimate customers including all aspects of digital rights management.

The term IP Rights Management (IPRM) encompasses conditional access as well as the various issues surrounding persistent access, defined as access to content after the customer has received and decrypted the content the first time. IPRM, typically referred to as Digital Rights Management (DRM), is essentially the generalization of conditional access technology.

The embodiments of the present invention herein provide XML interfaces that are used by external systems to use services provided by the IPRM system. These XML documents are processed by Caching Servers that deliver content to IPRM clients (Viewers) as well as by the IPRM clients that need to follow copy protection rules for the content that is being rendered and/or persistently stored. The embodiments herein specify XML definitions for all IPRM interfaces requiring XML-based input, specifically content access rights (a.k.a. DRM rules), user selection and user authorization (a.k.a. entitlements).

Definitions and Terminology

Content Provider—An entity that creates, licenses, aggregates and/or distributes content to the Cache Servers but it does not consume content. The Content Provider is also responsible for specifying content access rules and possibly user selection if the user actually makes the purchase at the content provider's web portal. Otherwise, it is made by the Confirmation Server.

Cache Server—An intermediate entity that stores and redistributes content to Consumers and optionally to other Cache Servers. Besides streaming content to viewers, it also enforces the content access rules against the user selection and user entitlements.

Confirmation Server—An application facilitating the creation of a session rights object.

Consumer—An entity such as an end-user that consumes content obtained from a Cache Server and optionally if permitted by the copyright holder, redistributes content to other Consumers in the system. The user is given a set of entitlements by the provisioning center that are used to determine the satisfaction of content access rules. When a user makes a purchase of a specific content, his selection is included in the Session Rights object.

Entitlements—A set of authorization attributes that allow user to access content.

Provisioning Center—An application that registers a new consumer (e.g., Viewer) with the network, provisions it with the Key Distribution Center (KDC) and creates a set of entitlements for the new user.

Session Rights Object—A signed version of content access rules for a given piece of content and specific user's purchase option selection.

Ticket—A token of trust issued to a viewer by the KDC in order to access content at a particular caching server. It also includes the user's entitlements.

Viewer—A consumer for video content.

System Overview

The exemplary embodiment of a IPRM system set forth herein provides digital rights management functions, such as authentication, privacy, security, integrity, access control and possibly non-repudiation tools to any multimedia streaming network based on Internet Protocols. The system supports point-to-point video on demand (VOD) and multicast delivery of content. Additional features relate to persistent content rights management, such as copy protection.

An exemplary embodiment of the present invention is initially based purely on software protection, with a limited trust placed upon the clients. This embodiment can be enhanced with an optional hardware security module, which may be mandatory to obtain rights to high quality content from copyright owners requiring high security levels.

The Session rights XML document is generated by the content provider or any other entity (e.g., a Confirmation Server) that provides the final interaction with the end-user. The content of the Session Rights document is encoded in the Session Rights Object (SRO) object.

The Authorization XML document is maintained by the Provisioning Server and is included in each ticket given to an end-user by the KDC.

The Rights Manager module on the Caching Server evaluates the rules and user selection against the authorization data in the ticket to allow or disallow access to the specified content.

XML Element Description

Each XML document consists of a root element and a set of nested elements. The following sections describe the structure and use of the IPRM XML schemas: Session Rights, Authorization Data, Persistent Entitlements and Copy Protection Rules. Their corresponding W3C Schemas are provided below. In addition, there is a CORE schema that defines IPRM data types and elements that are common to multiple schemas.

Session Rights Definition

The Rights element is the root element of the Session Rights document. It is a sequence of two required elements: Content and Selection and two optional elements: Provider and Rule. FIG. 1 depicts a block diagram of the Session Rights Element.

The Content element uniquely identifies the content associated with this set of session rights. Attribute "format" specifies in what format the content identification is specified (e.g., URL, ISBN, etc.) with URL being the default. The "id" attribute specifies the unique content identifier. When the 'protected' is 'Y' (which is the default), the associated content is encrypted both during the pre-encryption phase and when it is delivered to a consumer. Otherwise, the associated content is unprotected.

The Provider element optionally specifies the ProviderID ("pid" attribute) and the provider name as a text string.

The Rule element specifies a set of rules associated with the associated content specified in the "Content" element.

The "extern" attribute specifies whether the rules are defined in this document (value "false") or in an external document (value "true"). The default value is "false."

The rules however do not change often and can be cached for instance at a Caching Server where the user can retrieve protected content. In the future, in order to minimize bandwidth overhead, the "extern" attribute may be set to "true" when the rules are being cached. This would significantly reduce the size of each Session Rights Object (SRO).

The Selection element specifies the purchase selection the user, on whose behalf this Session Rights document is presented, has made.

The "optionID" attribute identifies a particular PurchaseOption defined within the Rule element that was selected by the user. Each option may be associated with different copy protection rules for persistent or non-persistent content.

The "extern" attribute specifies whether the selection is defined in this document (value "false") or in an external document (value "true"). The default value is "false."

When the "deviceBound" attribute is set to "Y", the content will not be shared outside the access device. If it is set to "N", then the content will be shared across user's authorized domain. If this attribute is not specified, need to check persistent entitlements to find out. This attribute affects how blackout verification is performed. If the content is not shared outside the access device, then the blackout check only applies to the locations (listed inside Authorization Data) that have the "AccessPoint" attribute set to "Y". Otherwise, all locations listed in Authorization Data need to be checked. The value of this attribute must be consistent with the persistent entitlements that are associated with the user selection.

Rule Element

The Rule element specifies all access rules associated with the specified content. It is a choice of one or more of the available rules. If the Rule element is not specified, it is assumed that the content:

Is free;

Not blacked out anywhere;

Has no rating associated with it;

Not available for subscription;

No particular level of security is required to access it.

In order to get access to such content, the Purchase element in the user Selection must be set to FREE.

Figure 2:
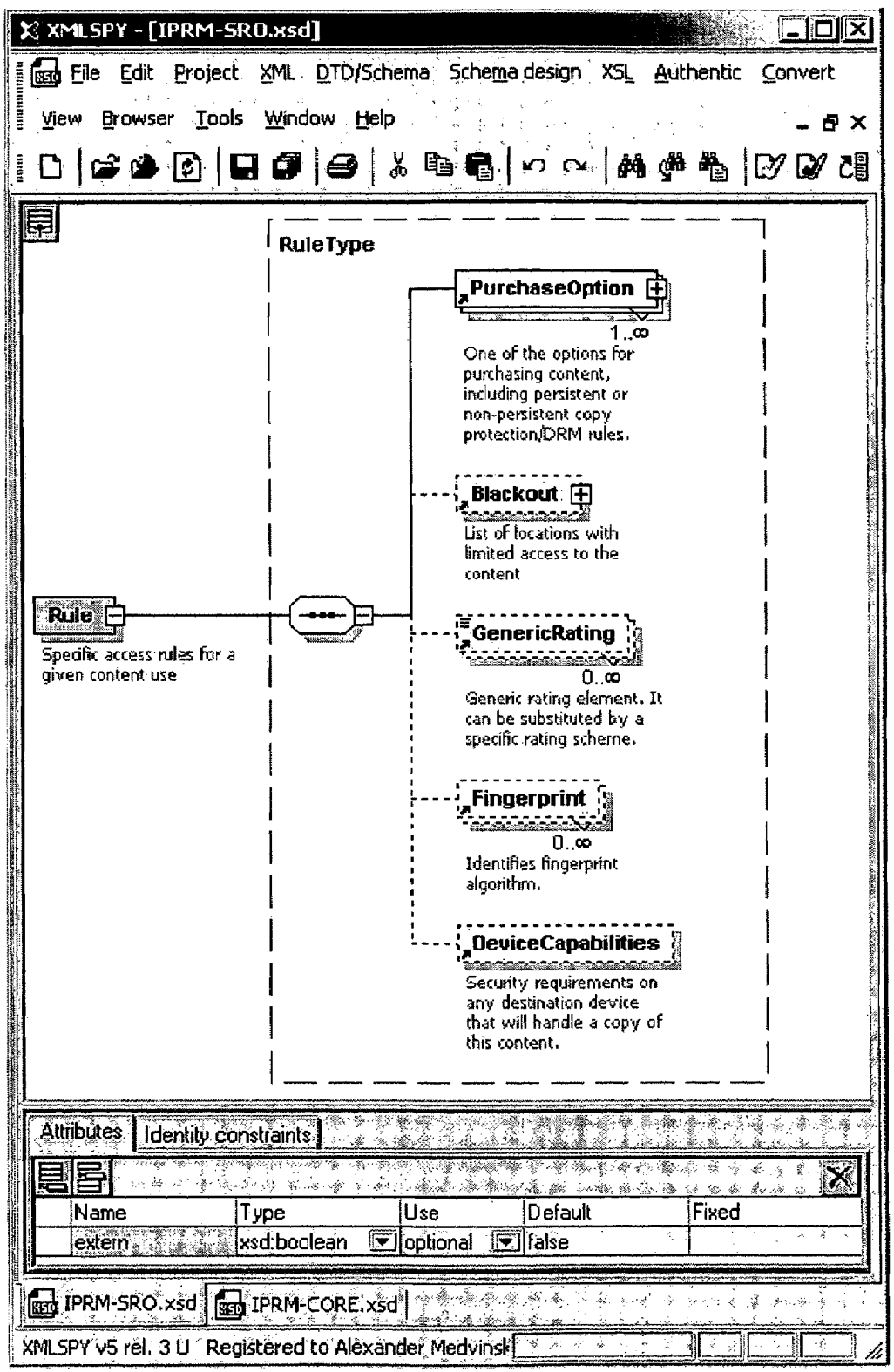
FIG. 2 depicts a Rule Element, which is part of an exemplary embodiment of a copyright protection scheme according to one aspect of the present invention.

FIG. 2 depicts the Rule Element in block diagram format.

The PurchaseOption element defines copy protection rules or DRM rules for persistent data associated with a specific option for purchasing this content. This option is also associated with a price and a list of subscription service under which this option may be selected for free or at a decreased cost. Multiple PurchaseOption elements may be included to indicate different options for the user to purchase the content. Some of the options may restrict the purchase to only initial rendering of the content, while other options may allow the user to save a copy of the content with varying DRM rules.

The "optionID" of the Selection element specifies the ID of the purchase option that was selected by the user. Typically, if an Origin Server generated a full set of Session Rights with both rules and user selection, there would only be a single PurchaseOption element included in the rules, which is the one selected by the user (in order not to waste bandwidth). But if the Origin Server generates only the user selection while rules are cached on a Caching Server, the rules would typically include all PurchaseOption elements associated with this content.

The Blackout element provides a mechanism to restrict access to the given content geographically. It provides the ability to define an area specified by a list of country codes or other types of location specifiers where the content is or is not allowed. This rule will be evaluated against the list of LocationGroups in the Authorization Data document.

The GenericRating element specifies the content rating level for a particular rating scale or standard (e.g., MPAA rating, TV rating, etc.). This element can be repeated multiple times in order to define the rating levels for multiple rating scales. This rule will be evaluated against the GenericRating element in the Authorization Data document representing the user-rating ceiling where the ceiling must be equal or higher than the content rating. This rule can be overridden by the Override element in the Selection element.

The Fingerprint elements specify a list of fingerprint algorithms that may be applied to the content that is being sent to a client. If at least one such element is present, one of these fingerprint algorithms must be applied by the streaming server.

The DeviceCapabilities element specifies security requirements for a consumer device receiving this content. Some of these security requirements apply to content rendering, while others apply when a device makes a persistent copy of the content.

Requirements for rendering:

securityLevelToRender attribute is the minimum security level of the content rendering device.

codecInSecureHW attribute is a flag that when true ("Y") requires a rendering device to decompress content inside secure hardware.

WatermarkInSecureHW attribute is a flag that when true ("Y") requires a rendering device to perform watermark detection inside secure hardware.

FingerprintInSecureHW attribute is a flag that when true ("Y") requires a rendering device to insert a fingerprint inside secure hardware.

The OneTimePay element specifies the price for the pay-per-view purchase mechanism. The "price" attribute specifies the cost for accessing this content.

The PBT element provides a mechanism to purchase content at time increments. The "increment" attribute specifies the time interval (in minutes) the "price" is associated with. For instance, if the "price" is 0.95 cents and the increment value is 30, the user will be charged 0.95 cents for each 30 minutes that she views the content.

This rule will be checked against the Payment element in the Selection element and evaluated against the Pay element in the Authorization Data document representing the user ability to pay for content. Table 1 below defines the relationship between elements of the PurchaseOption (in columns) and user Selection (in rows).

| Rule & Selection | Subscription Group | Cost-OneTimePay | Cost-PBT | Neither | Authorization: Pay |
|---|---|---|---|---|---|
| SUBSCR | YES | N/A | N/A | DENIED | Depends (see below) |
| OneTimePay | N/A | YES | N/A | DENIED | INDIVIDUAL |
| PBT | N/A | N/A | YES | DENIED | INDIVIDUAL |
| FREE | NO | NO | NO | YES | N/A |

Requirements for copying:

SecurityLevelToCopy attribute is the minimum security level of the destination device that is getting a persistent copy of the content.

This rule will be evaluated against the SecurityLevel attribute of the client ticket.

PurchaseOption Element

Figure 3:
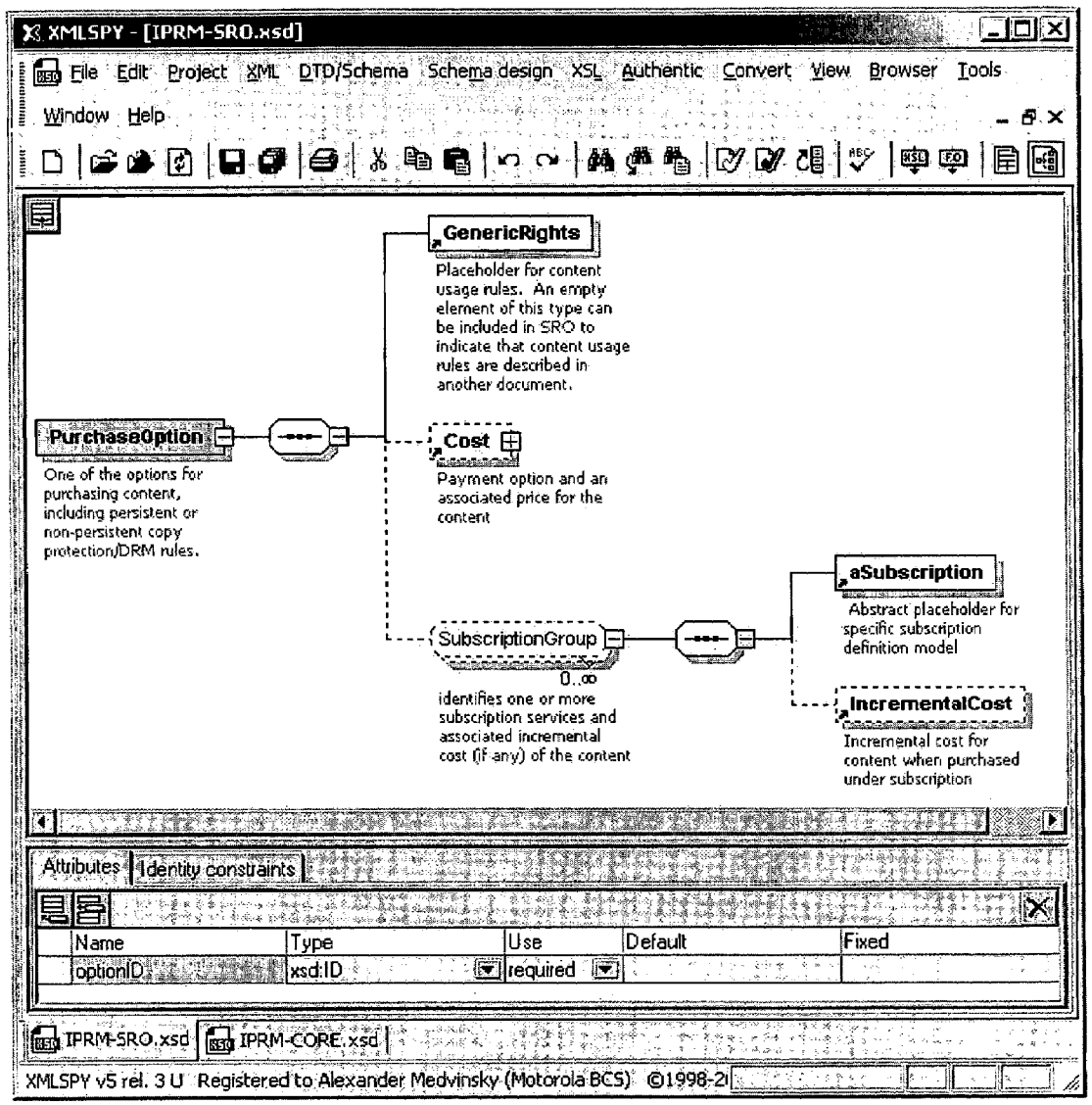
FIG. 3 depicts a Purchase Option Element, which is part of an exemplary embodiment of a copyright protection scheme according to one aspect of the present invention.

One or more of the PurchaseOption elements are included in the Rule element. The PurchaseOption element is illustrated in FIG. 3.

GenericRights element has no type when directly present and indicates that the actual copy protection rules or rights associated with persistent content are specified in a different XML document. This element is also a substitution group and the substitution elements may be:

CopyProtectionRules—defines copy protection rules associated with the content that is not saved persistently but could be forwarded to various digital and analog outputs. This element is defined in a separate XML schema, see section below.

PersistentEntitlements—content usage rules associated with a persistent copy of the content. The presence of this element indicates that the content will either be downloaded or recorded by a client device during a streaming session. This element is defined in a separate XML schema, see below.

Cost element specifies the price of the content. The "currency" attribute specifies the currency expressed as a 3-letter acronym defined by ISO 4217. US dollar is the default value. If a different currency representation is needed in the future, the "format" attribute can be used to specify other formats. This element is not applicable when content is made available on subscription basis only.

If the Cost element is not specified, the content cannot be purchased and may be available for subscription. If the Subscription element is not specified either, the content is assumed to be FREE.

The nested elements specify different ways to buy the content.

When a particular value of Selection is present, value YES specifies that the element of PurchaseOption in that column must be present and will be evaluated; value N/A specifies that the corresponding element may be present but will not be used for evaluating access rights; value NO means that the rule must not be present; value DENIED means that access will be denied. In addition, the most right column shows the required value of the Pay element from the user authorization.

In the case that the Payment element of the user selection is set to SUBSCR, the selected PurchaseOption must contain one or more SubscriptionGroups. If there is at least one matching SubscriptionGroup without an IncrementalCost element, then the Pay element in the user selection will be ignored. Otherwise, the value of the Pay element must be INDIVIDUAL.

If none of the Subscription or Cost rules is specified, the content can be accessed only if the user Selection is set to FREE.

SubscriptionGroup includes the following two elements:

aSubscription element specifies a list of services on which this piece of content is available for subscription. This element is described in more detail below. This rule will be evaluated against the list of aSubscription elements in the Authorization Data document if the user selects the "SUBSCR" purchase option. If the user has at least one of the provider/service pairs in his entitlements, he will be granted access to the service (assuming that other rules, such as blackout and rating, are satisfied as well).

Figure 4:
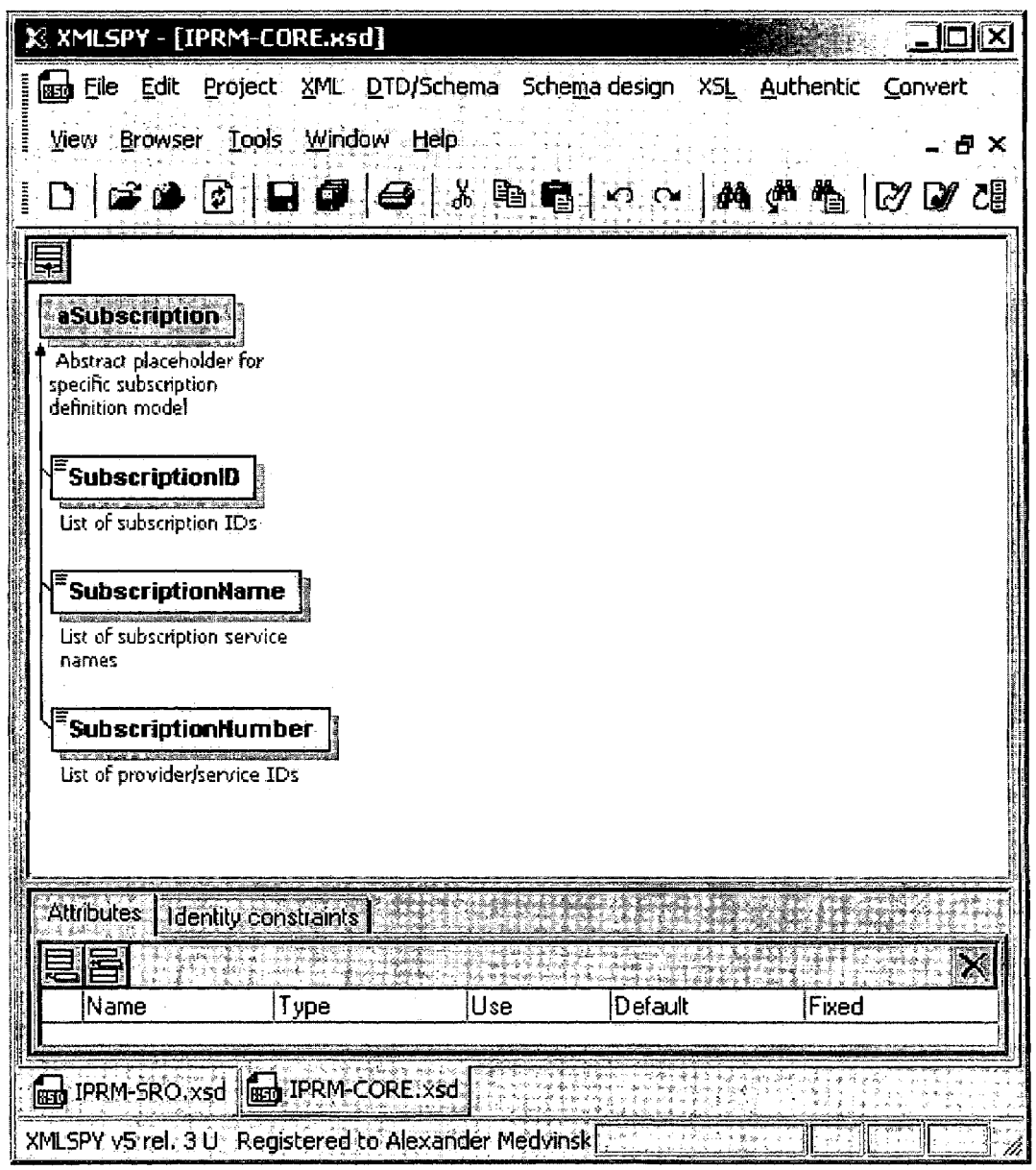
FIG. 4 depicts a Subscription Element, which is part of an exemplary embodiment of a copyright protection scheme according to one aspect of the present invention.

IncrementalCost optional element is associated with a particular aSubscription element and indicates that there is still an amount that needs to be paid when the content is obtained through a subscription to one of the specified services. The "currency" and "format" attributes are the same as the "currency" and "format" attributes for the Cost element of the PurchaseOption. The "price" attribute specifies the (possibly reduced) cost for the content when it is obtained through this subscription.

aSubscription Element aSubscription element specifies a list of services on which this piece of content is available for subscription and is illustrated in FIG. 4.

Because there are multiple methods for identifying service providers and services, aSubscription is an abstract placeholder for a specific subscription element. The substitution elements for aSubscription are:

SubscriptionID—a list of 2-byte unsigned integers representing service identifiers. This element also has an optional "provider" attribute that is a 2-byte unsigned integer that identifies a provider. The reason that provider is optional is because in some cases service identifiers may be globally unique and may already imply a specific service provider.

SubscriptionName—a list of service names separated by white space. Each name may not itself contain white space. This element also has an optional "provider" attribute that is the provider name (with no white space characters). In the case that service names are globally unique or already imply a specific provider, the provider attribute may be omitted.

SubscriptionNumber—a list of concatenated provider and service identifiers (2 bytes for provider, 2 bytes for service).

Blackout Element

Figure 5:
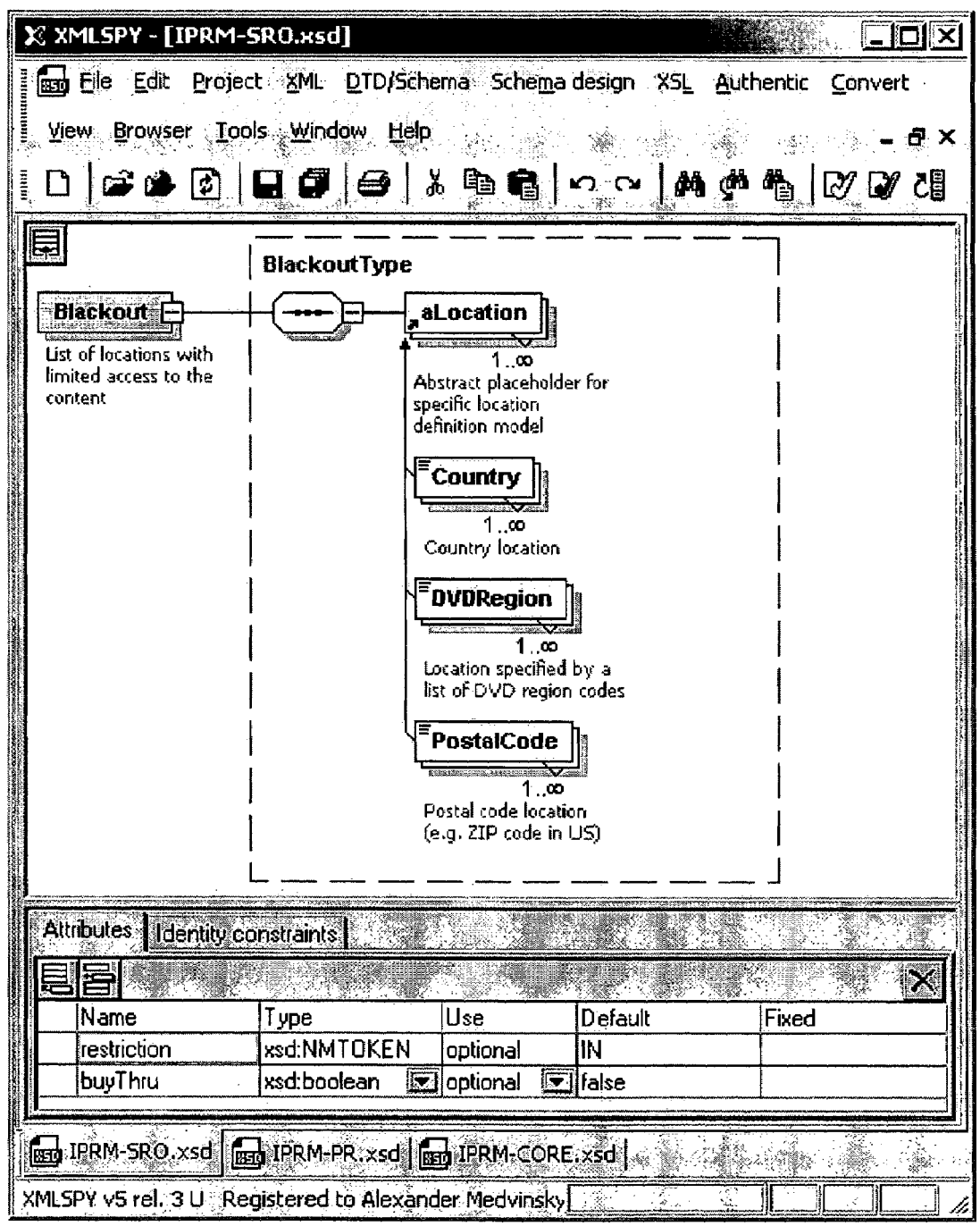
FIG. 5 depicts a Blackout Element, which is part of an exemplary embodiment of a copyright protection scheme according to one aspect of the present invention.

The Blackout element is a sequence of locations where the content may or may not be viewed (depending on the value of the "restriction" attribute described below), as illustrated in FIG. 5.

The "restriction" attribute specifies whether the content is blacked out (i.e. disallowed) inside the specified geographic area (value IN) or outside of the area (value OUT). The "buyThru" attribute specifies whether the content can be purchased when the user would be otherwise blackout out. This is useful for content distributed on subscription basis.

Each element of the Blackout sequence is a substitution group, needed to accommodate different types of location codes. The element aLocation is an abstract placeholder for a specific location element. The substitution elements for aLocation are:

Country—a list of tokens separated by white space, where each token identifies a country as a two-character country code defined in "ISO3166" (the default value of the "format" attribute—other formats may be supported in the future).

DVDRegion—location specified by a list of DVD region codes separated by white space. The possible region codes are:

1=U.S., Canada, U.S. Territories

2=Japan, Europe, South Africa, and Middle East (including Egypt)

3=Southeast Asia and East Asia (including Hong Kong)

4=Australia, New Zealand, Pacific Islands, Central America, Mexico, South America and the Caribbean 5=Eastern Europe (Former Soviet Union), Indian subcontinent, Africa, North Korea and Mongolia 6=Peoples Republic of China 7=Reserved 8=Special international venues (airplanes, cruise ships, etc.)

PostalCode—a list of tokens separated by white space, where each token is a postal code location (e.g. ZIP code in US).

It has an optional boolean attribute "long" that specifies if the postal code is expressed in long form (e.g., 9-digit US ZIP code instead of a 5-digit one). If this attribute is not present, the short form is assumed.

An optional "country" attribute specifies a country within which the postal codes are located. If the country is not specified, US is assumed. There is also an accompanying optional "format" attribute that specifies the type of the country code used in the value of the "country" attribute. The default value for "format" is "ISO3166".

GenericRating Element

Figure 6:
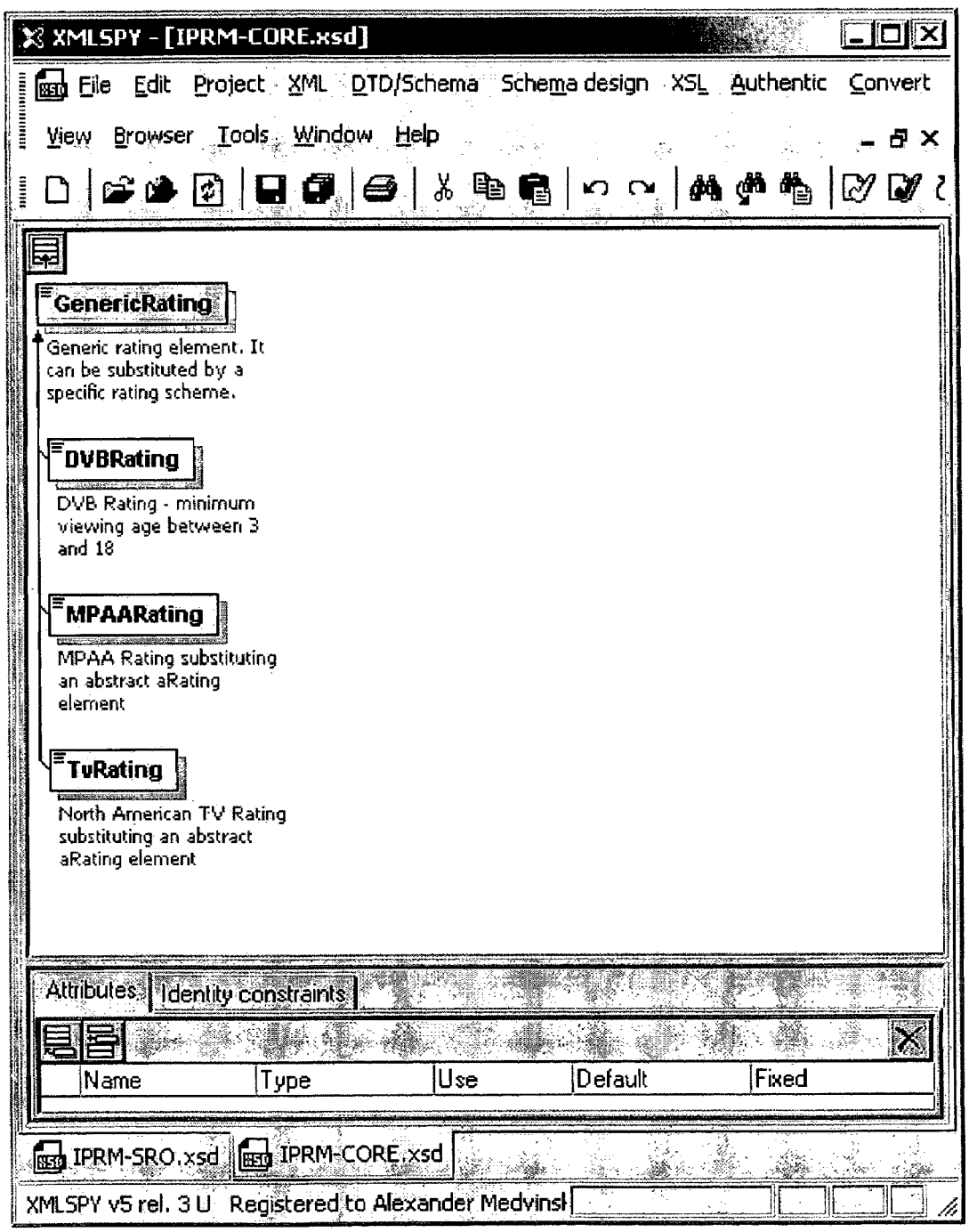
FIG. 6 depicts a Generic Rating Element, which is part of an exemplary embodiment of a copyright protection scheme according to one aspect of the present invention.

The GenericRating element specifies a content rating as illustrated in FIG. 6. GenericRating element is of type NMTOKEN and has the following possible values:

LEVEL0, LEVEL1, LEVEL2, LEVEL3, LEVEL4, LEVEL5

GenericRating may be used as a custom content rating scale where the meaning of each level is the same in both the Session Rights and in the Authorization Data XML documents. Because there are multiple rating scales, GenericRating is also a substitution group. The substitution elements for GenericRating are:

DVBRating—a positive integer between 3 and 18 that represents a minimum allowable age of the viewer.

MPAARating—a string with no white space that represents one of the MPAA rating levels.

TvRating—a string with no white space that represents one of the North American TV rating levels.

It is possible to have multiple content rating elements in both Session Rights and Authorization Data XML documents. In that case, one has to compare pairs of content rating elements from Session Rights and Authorization Data that are of the same type. For example, MPAARating element in Session Rights would be compared to an MPAARating element in Authorization Data. If the rating ceiling set in Authorization Data is not exceeded for every such pair of rating elements, then the content rating check passes. If both Session Rights and Authorization Data have content rating elements but none of them have matching types, then the content rating check passes as well.

Selection Element

The Selection element specifies user selection related to the consumption or purchase of the selected content. It is a sequence of the following elements.

Figure 7:
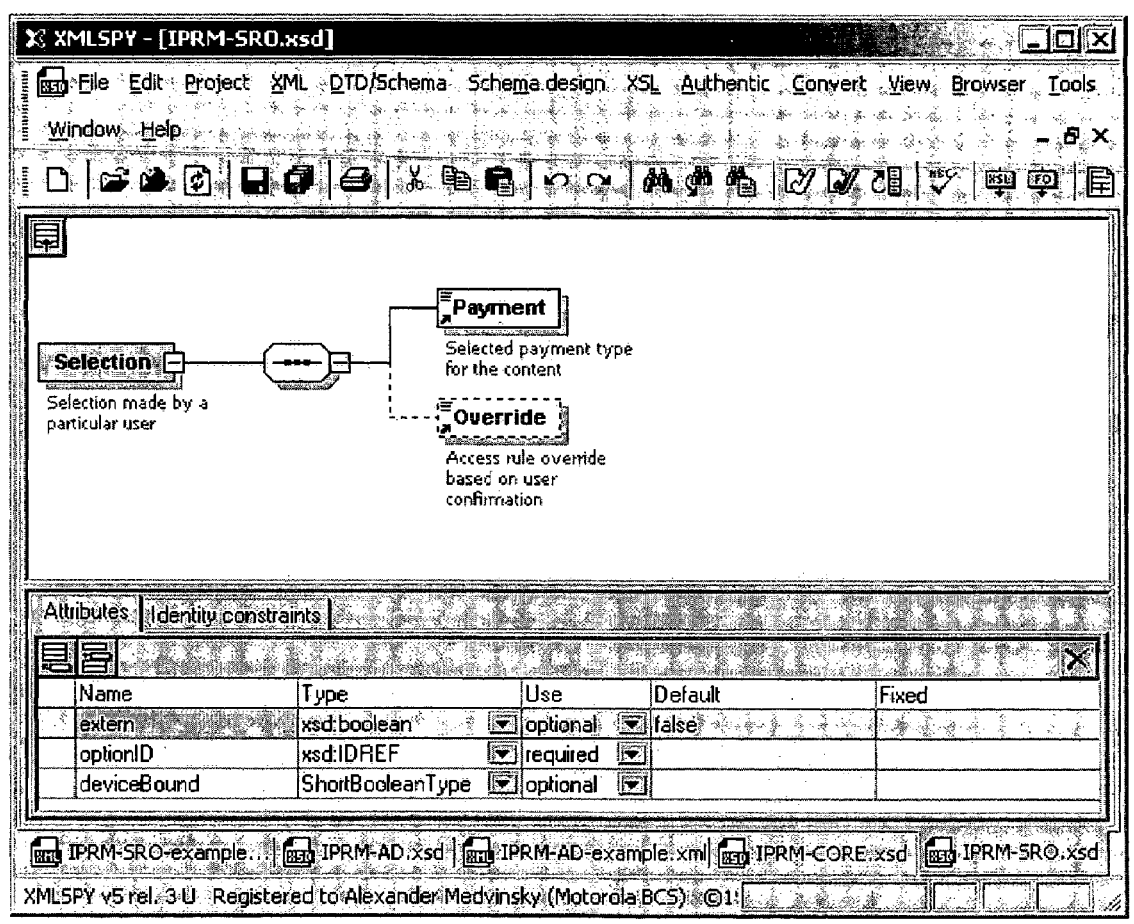
FIG. 7 depicts a Selection Element, which is part of an exemplary embodiment of a copyright protection scheme according to one aspect of the present invention.

FIG. 7 depicts a Selection Element.

Purchase element specifies the purchase option the user has selected in order to obtain access to the content. The following values are defined:

FREE—the content is free

SUBSCR—the user has a subscription to the service

ONE-TIME-PAY—the user selected the option to buy the content based on a single payment (no subscription)

PBT—the user selected the option to buy the content on pay-by-time basis

Override element specifies whether the user has overridden his rating ceiling when he ordered the content (e.g. provided a password or PIN code to the purchase or confirmation server). The value of this element specifies what rule was overridden, meaning that the rule is not going to be enforced. RATING is the only value currently supported.

Authorization Data Definition

The Authorization element is the root element of the User Authorization Data document. It is a sequence of several optional elements: purchasing capability (Pay element), user location (Country element), user subscription (Subscr and SubscrList elements), content rating ceiling (Rating element) and an element of type "any".

The Authorization element has several attributes:

principal—a unique identifier of an end-user client who is requesting the specified content. This attribute is required so that it can be used for billing purposes, for instance.

operator—an optional attribute identifying the network provider (MSO, ISP, etc.) of the end-user identified by the principal name above.

Figure 8:
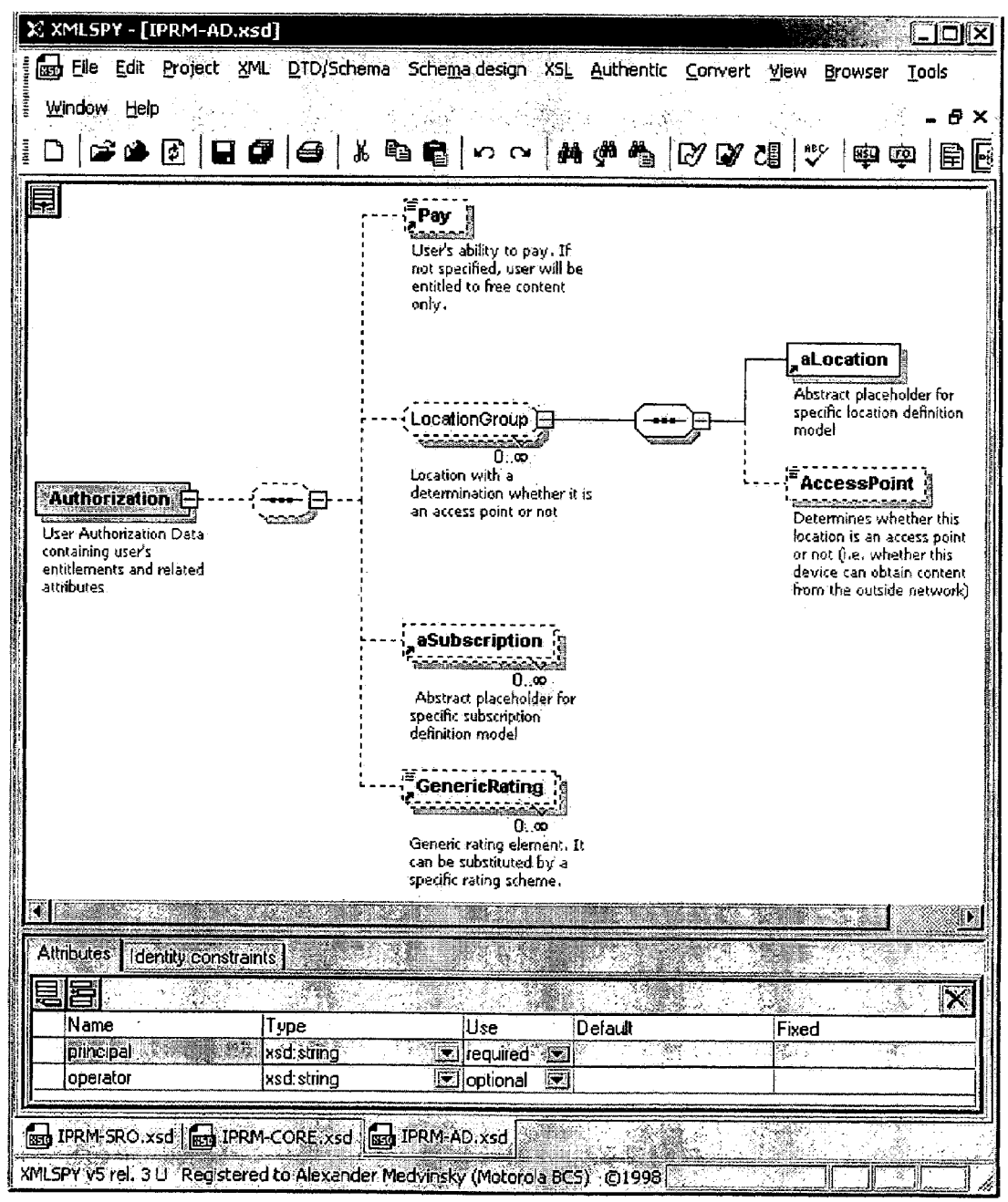
FIG. 8 depicts a User Authorization Element, which is part of an exemplary embodiment of a copyright protection scheme according to one aspect of the present invention.

FIG. 8 depicts the User Authorization Element.

Pay element specifies users ability to pay for content. The following values for the "type" attribute are defined:

INDIVIDUAL—User is allowed to pay for individual content (e.g. PPV or PBT)

LocationGroup includes aLocation element that specifies the location of the user, which is used to evaluate blackout rules. This is an abstract placeholder for elements that identify a specific type of location (such as country or zip code). For detailed description of this element, see below (where aLocation is described as a component of the Blackout element).

There is also an optional AccessPoint element that when true ("Y"), indicates that this is the location of an access point that initially obtains the content after the content purchase. If this element is false ("N"), then this is the location of a segment of the user's personal network and applies when the user purchased content with the rights to keep a persistent copy and render it on any device within the user's personal network. The default value is "Y".

When checking if a blackout applies to a user for view-only content, only LocationGroups with AccessPoint set to true (or not present) need to be checked. On the other hand, for content that is to be saved persistently and shared within the user's personal network, all LocationGroups need to be checked.

If no LocationGroup is provided, the blackout rules are evaluated as if the user were located everywhere meaning that the user will always be blacked out if blackout rules are specified.

aSubscription element specifies a service or a list of subscription services provided by a given service provider. It is an abstract substitution element that allows for the services and service providers to be identified using different conventions.

GenericRating element specifies the user-selected content rating ceiling, i.e., the highest level of rating allowed for a given rating dimension. This is an abstract substitution element that allows different rating methods to be used. Authorization for the same user can have multiple GenericRating elements in order to convey the rating ceilings for multiple content rating methods.

Persistent Entitlements Definition

Figure 9:
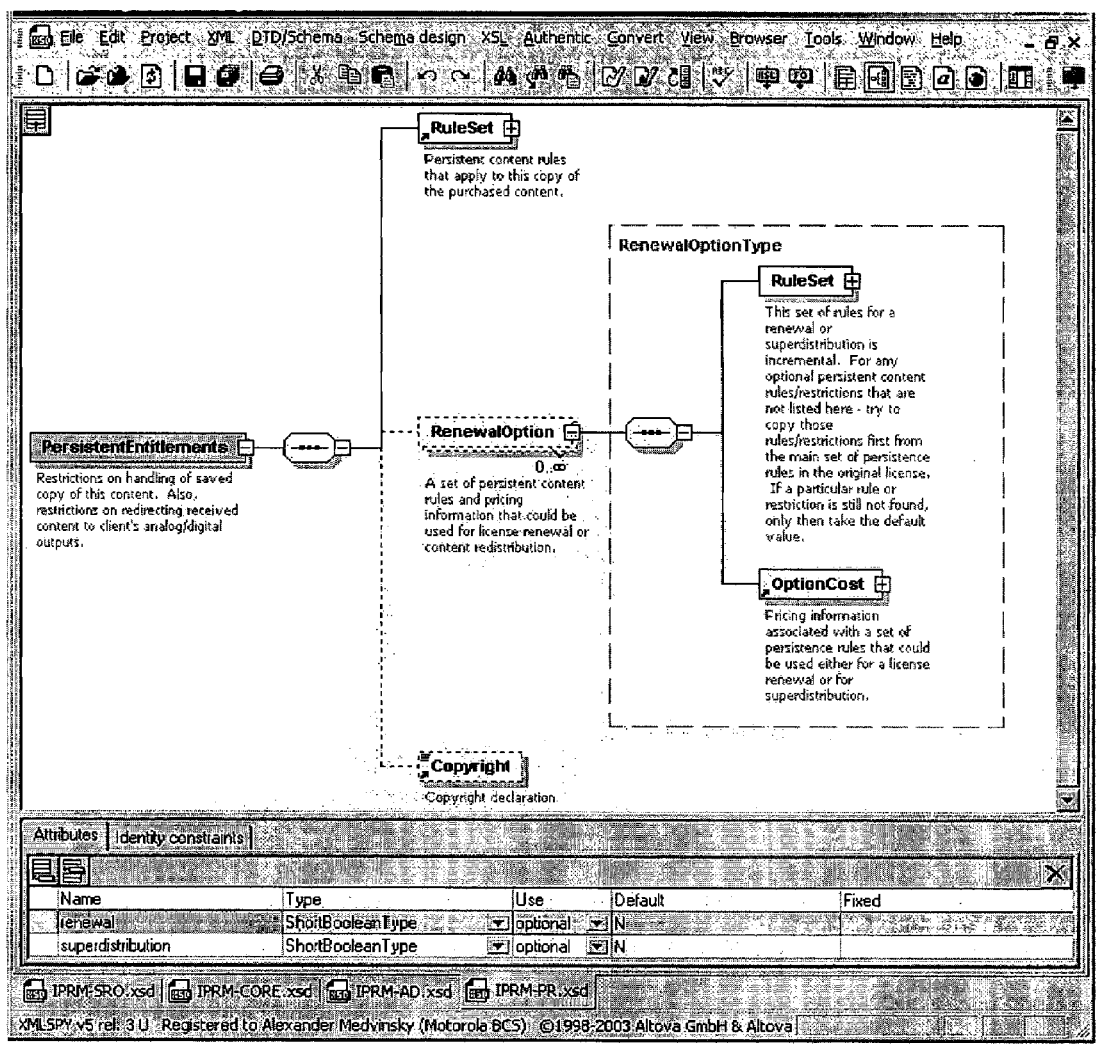
FIG. 9 depicts a Persistent Entitlements Element, which is part of an exemplary embodiment of a copyright protection scheme according to one aspect of the present invention.

The PersistentEntitlements element is the root element of the IPRM Persistent Rights schema. It can either be utilized as a separate XML document that is included inside the SRO along with the Session Rights document, or it can be included directly inside the Session Rights as part of one of the PurchaseOption elements (see section 3.1.1.1). It is illustrated in the FIG. 9.

PersistentEntitlements contains the following attributes:

renewal—if 'Y', this license may be renewed after it expires. In other words, a request may be sent to a License Server to obtain a new license for already stored content. The rules that would appear in a new license after a renewal can be either taken from one of the renewal options (see below) or a new set of rules can be obtained (inside an SRO) from an Origin Server.

superdistribution—if 'Y', the corresponding content may be superdistributed to other users (which would still have to pay in order to get a valid license for the content). The rules that would appear in a new license associated with a superdistributed copy of the content can be either taken from one of the renewal options (see below) or a new set of rules can be obtained (inside an SRO) from an Origin Server.

PersistentEntitlements is also a sequence of the following elements:

RuleSet element is a set of content usage rules and restrictions associated with the content.

RenewalOption elements. When the Renewal attribute is set for PersistentEntitlements, each RenewalOption represents a possible set of rules that would go into a new license after a renewal. A RenewalOption also includes a cost—an amount of money that would be charged to a consumer for renewing a content license with this option.

A RuleSet element of the RenewalOption has the same type as the RuleSet element of the PersistentEntitlements. However, in this case the RuleSet represents incremental changes from the original set of rules. When a renewal option is selected, the resulting set of content rules/restrictions is obtained as follows:

a) If a particular rule or restriction is found only in the original (base) RuleSet, copy it into the new PersistentEntitlements.

b) If a particular rule or restriction is found only in the RuleSet for the selected renewal option, copy it into the new PersistentEntitlements.

c) If a particular rule or restriction is found in both the base RuleSet and in the RuleSet for the renewal option, take the one in the renewal option.

d) If a particular rule or restriction is found in neither of the two rule sets, use a default value.

The OptionCost element of the RenewalOption contains both the cost for license renewal using this option and a cost of superdistribution using this option (that may be different from the renewal cost). For more detailed description of OptionCost, see section 3.3.2.

Copyright element is the copyright information associated with the content.

RuleSet Element

The RuleSet element specifies all the rules associated with the specified persistently stored content. (The identity of the content, e.g., a URI, is not present inside the RulesSet or inside the PersistentEntitlements. The content identity is generally a separate parameter that accompanies the PersistentEntitlements XML document (e.g., a separate TLV parameter inside Persistent Data Entitlements DOI object).

Figure 10:
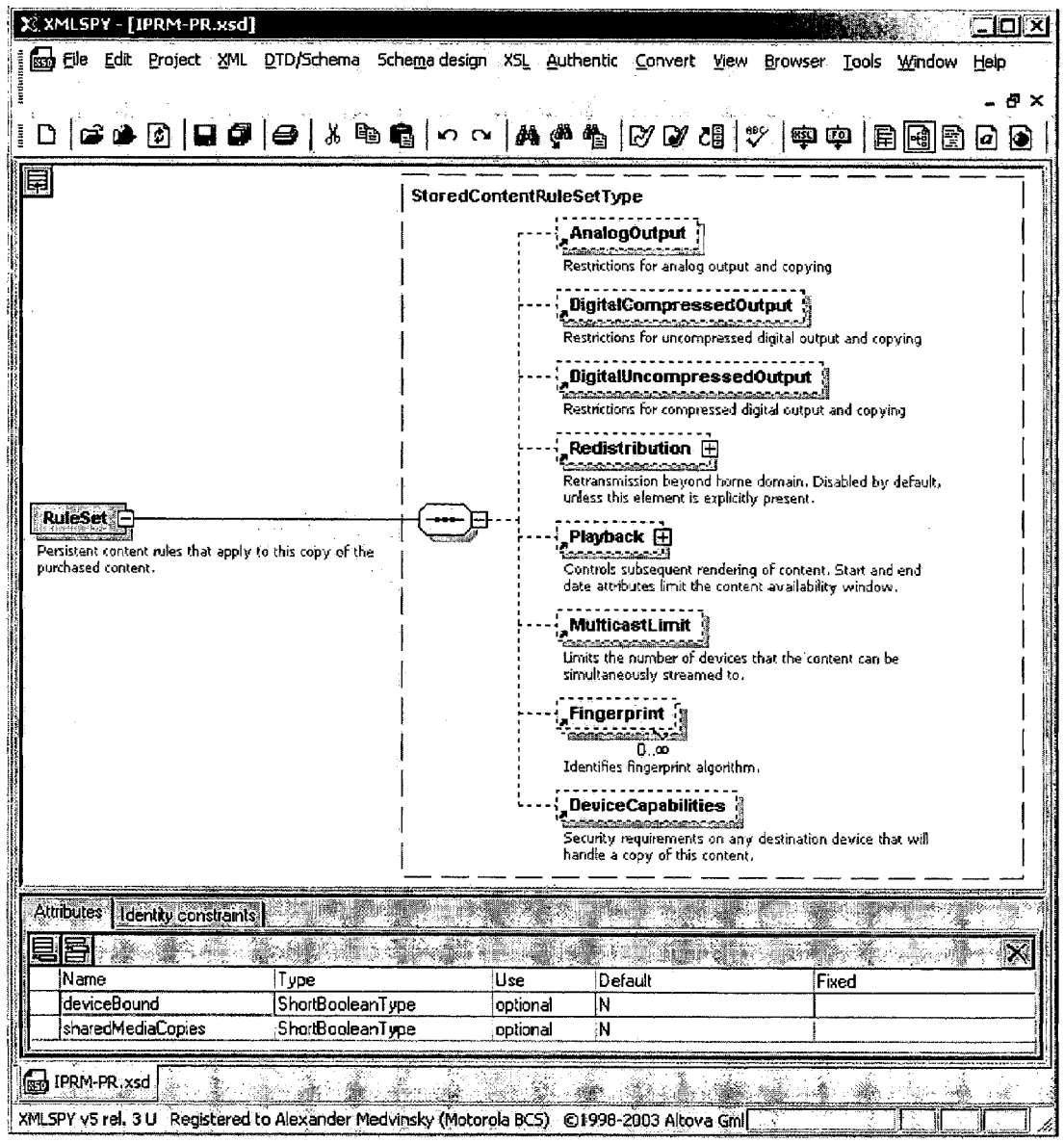
FIG. 10 depicts a Rule Set Element, which is part of an exemplary embodiment of a copyright protection scheme according to one aspect of the present invention.

FIG. 10 depicts the RuleSet Element.

A RuleSet element contains the deviceBound attribute, which is a boolean flag that when set to "Y" means that once a Viewer saves a copy of this content, no further copies of the content may be made, even within the same authorized domain (user's personal network) protected by IPRM security.

RuleSet also includes the sharedMediaCopies attribute, which is a boolean flag that when set to "Y" allows copies of this content to be made on shared removable media. A single copy of the content on a shared removable media can be played on any device within the same authorized domain.

However, if "deviceBound" attribute is "Y", copies of the content on shared removable media are not allowed even when "sharedMediaCopies" attribute is "Y".

RuleSet is of type StoredContentRuleSetType, which is a sequence with each element described in the following subsections.

AnalogOutput

This element restricts copies over an analog interface. It can also define MACROVISION parameters, where MACROVISION is a mechanism to prevent analog copies of a video signal and would normally be used when the 'copyRestriction' attribute defined below is set to NOCOPY (i.e., analog copies are not allowed).

Today, within most of commercially available devices no such equivalent exists for analog audio. Therefore, in most cases when 'copyRestriction' for analog is set to NOCOPY for an audio-only (e.g., music) content, analog output has to be completely disabled.

AnalogOutput consists of the following attributes which are apply specifically to analog output:

copyRestriction—an enumeration type that specifies a copy protection state associated with analog interfaces. The IPRM system must ignore (but still preserve) this attribute except in the case when it is exporting content over an analog interface. In that case, the IPRM system must translate this copy protection state to whatever means are available on the particular analog interface, including CGMS-A and MACROVISION. This attribute can have one of the following values:

UNLIMITED—no limitation on the number of copies of the content that is received over an analog interface.

NOCOPY—copying of the content received over an analog interface is not permitted. In practice this means that when content is transmitted over an analog interface, MACROVISION must be turned on. Some analog video interfaces also support CGMS-A copy protection bits inside VBI.

NOMORE—no more copies of this content may be made over an analog interface. One way that IPRM-controlled content could get this setting is during the following scenario:

The content is imported into the IPRM system over an analog interface.

This analog interface carries CGMS-A copy protection bits over VBI.

The CGMS-A relayed over the analog interface was set to ONEGENERATION.

Therefore, when the IPRM system imports this content, it is obligated to transition the copy protection state from ONEGENERATION to NOMORE.

ONEGENERATION—only a single copy of the content received over an analog interface may be made. When that copy is made, the copy protection state must be changed to NOMORE. It may be possible to relay this copy protection state over some analog interfaces using CGMS-A over VBI.

numberOfCopies—this attribute is applicable only when copyRestriction attribute is set to ONEGENERATION. In that case, this attribute specifies how many ONEGENERATION copies of the content may be made over an analog interface. The value of 0 (or if numberOfCopies attribute is not present) means that there is no limit on the number of ONEGENERATION copies made. The maximum value of this attribute is 3.

componentOutput—a boolean flag. When set to 'Y', it is OK to transmit this content over a component analog output.

outputAllowed—a boolean flag. When set to 'N', analog output of any type for this content is disabled. Note that ExCCI doesn't have this option—it only disables component (video) output. But component output does not apply to audio-only content, in which case this attribute may be used instead.

pseudoSyncPulse—a boolean flag. When set to 'Y', MACROVISION must utilize a Pseudo Sync Pulse (PSP).

splitColorBurst—an enumeration type that can have the following values:

N—split color burst not utilized by MACROVISION

2—use 2-line split color burst for MACROVISION

4—use 4-line split color burst for MACROVISION constrainedImage—limits a video image resolution on an analog output. When set to 0, there is no restriction on resolution. When set to 1, an application generating an analog output will decide how to restrict the video image resolution. Otherwise, this attribute specifies a limit on a number of pixels per frame (e.g., in ExCCI, a constrained video image is limited to 520,000 pixels per frame).

constrainedAudio—limits audio bit rate on an analog output. When set to 0, there is no restriction on audio bit rate. When set to 1, an application generating an analog output will decide how to restrict the audio bit rate. Otherwise, this attribute specifies a limit on the bit rate in KBits/sec for analog audio output.

audioChannelLimit—limits the number of audio channels for analog output. When set to 0, there is no restriction on the number of audio channels. Otherwise, this attribute specifies a limit on the number of audio channels (e.g., if the limit is 2, a surround sound audio signal has to be converted to stereo with only 2 channels).

DigitalCompressedOutput

This element restricts copies over an external digital compressed interface that is not protected with the IPRM system. An example of such an interface would be IEEE-1394 (Firewire bus). However, if there is an IP stack running on top of IEEE-1394 and IPRM is used to protect content over this interface, this element would be ignored.

DigitalCompressedOutput consists of the following attributes:

copyRestriction—an enumeration type that restricts the number of copies of the content that may be made over an external digital compressed interface. The values of this attribute are defined above. This attribute does not apply (but must be preserved) when content is exchanged between devices in the same authorized domain using IPRM security. When content is transferred over an external digital compressed interface, this copy protection state must be translated (e.g., to CGMS-D) and sent over the specific digital compressed interface.

numberOfCopies—this attribute is applicable only when copyRestriction attribute is set to ONEGENERATION. In that case, this attribute specifies how many ONEGENERATION copies of the content may be made over an external digital compressed interface. The value of 0 (or if numberOfCopies attribute is not present) means that there is no limit on the number of ONEGENERATION copies made. The maximum value of this attribute is 3.

outputAllowed—when this boolean flag is set to 'N', digital compressed content must not be sent over external interfaces even when they are encrypted using a non-IPRM copy protection technology (e.g., 5C). This flag applies when content is sent with an intent to copy as well as when the content is sent with an intent to render-only.

DigitalUncompressedOutput

This element restricts copies of the content that is received over an external digital uncompressed interface (e.g., DVI) that is not protected with IPRM. This element consists of the following attributes:

copyRestriction—an enumeration type that restricts the number of copies of the content received over an external digital uncompressed interface. The values of this attribute are defined above. This attribute does not apply (but must be preserved) when content is exchanged between devices in the same authorized domain using IPRM security. When content is transferred over an external digital uncompressed interface, this copy protection state must be translated (e.g., to CGMS-D) and sent over the specific digital uncompressed interface.

numberOfCopies—this attribute is applicable only when copyRestriction attribute is set to ONEGENERATION. In that case, this attribute specifies how many ONE-GENERATION copies of the content may be made over an external digital uncompressed interface. The value of 0 (or if numberOfCopies attribute is not present) means that there is no limit on the number of ONEGENERATION copies made. The maximum value of this attribute is 3.

outputAllowed—when this boolean flag is set to 'N', digital uncompressed content must not be sent over external interfaces even when they are encrypted (e.g., with HDCP). This flag applies when content is sent with an intent to copy as well as when the content is sent with an intent to render-only.

Redistribution

This element defines rules for retransmission of the content beyond the current authorized domain. Note that this element does not apply to superdistribution where a copy of the content is sent to another consumer (in a new authorized domain) without any rights to use the content. This element is used in the cases when an initial set of persistent content entitlements already allows the content to be lawfully shared between multiple authorized domains without an additional cost.

This element has the following attribute:

contentOperation—defines how the content is to be consumed by a particular destination. The list of authorized domains to which the content may be streamed, moved or copied can be optionally restricted—see below. This is an enum-valued attribute that can take on the following values:

STREAM—This allows you to only stream the content to a particular destination. The content may not be recorded, copied or moved.

MOVE—This allows you to either stream the content to a destination, or move the content. A move means that as soon as a copy or recording of the content is made at the destination, the original copy must be removed. In the case of a move, all copies of the content in the original authorized domain must be removed.

COPY—This allows the content to be streamed, recorded, moved or copied to a destination.

Figure 11:
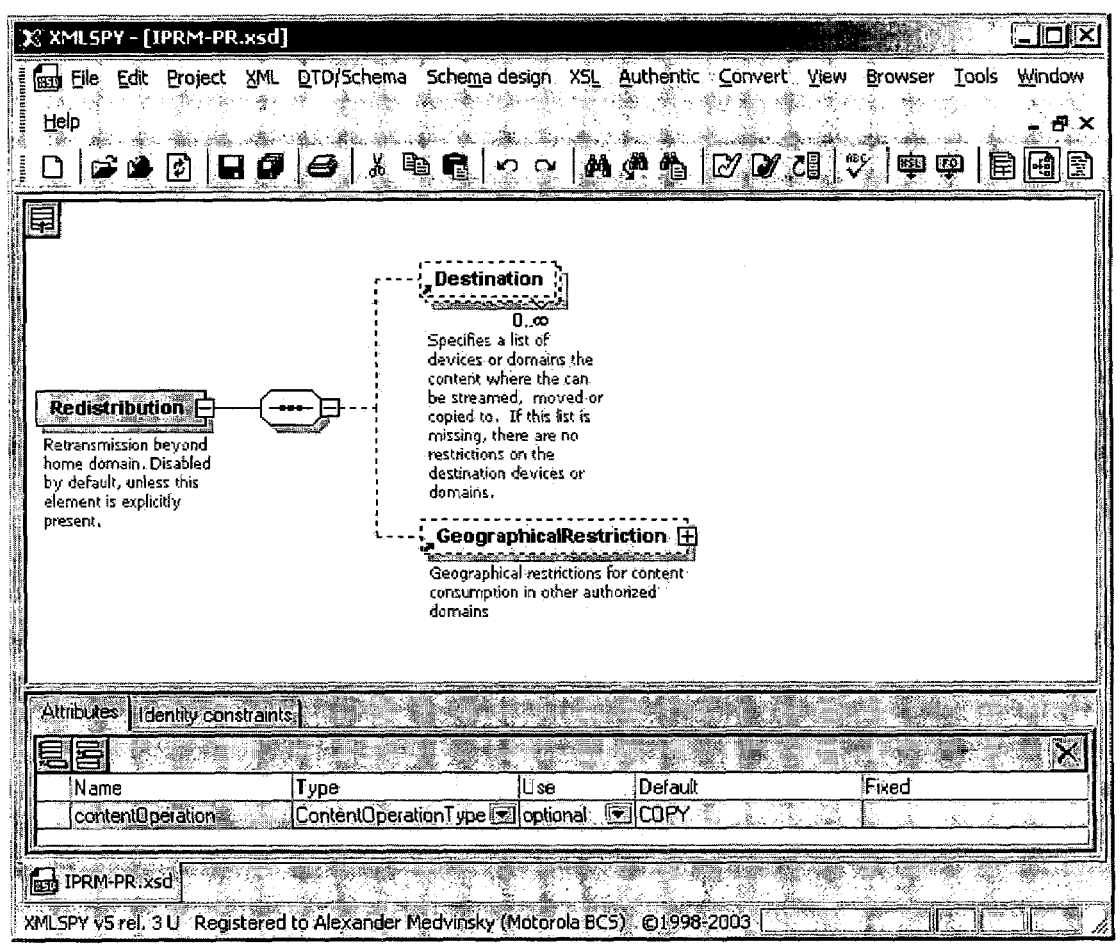
FIG. 11 depicts a Redistribution Element, which is part of an exemplary embodiment of a copyright protection scheme according to one aspect of the present invention.

The Redistribution element is illustrated in FIG. 11.

Redistribution element includes a sequence of 0 or more Destination elements, where each destination element allows the content to be copied, moved or streamed (as specified by the "contentOperation" attribute) to that specific destination that is outside of the current authorized domain.

A Destination element contains the following attributes:

realm—identifies another authorized domain to which the content can be copied, moved or streamed. In the case of an IPRM system that utilizes the ESBroker key management protocol, this parameter is identical to an ESBroker realm for that authorized domain.

id—a host identifier for a specific device in the specified authorized domain to where the content may be copied or moved. If this parameter is not included, the content may be copied, moved or streamed to any device in the specified authorized domain.

Redistribution element can also optionally include a GeographicalRestriction element that might prevent streaming, movement or copying of content into authorized domains listed in Destination elements if they are located in blacked out geographical regions. This is the same as the Blackout element described herein, except that there is no "buyThru" attribute in this case.

Playback

Figure 12:
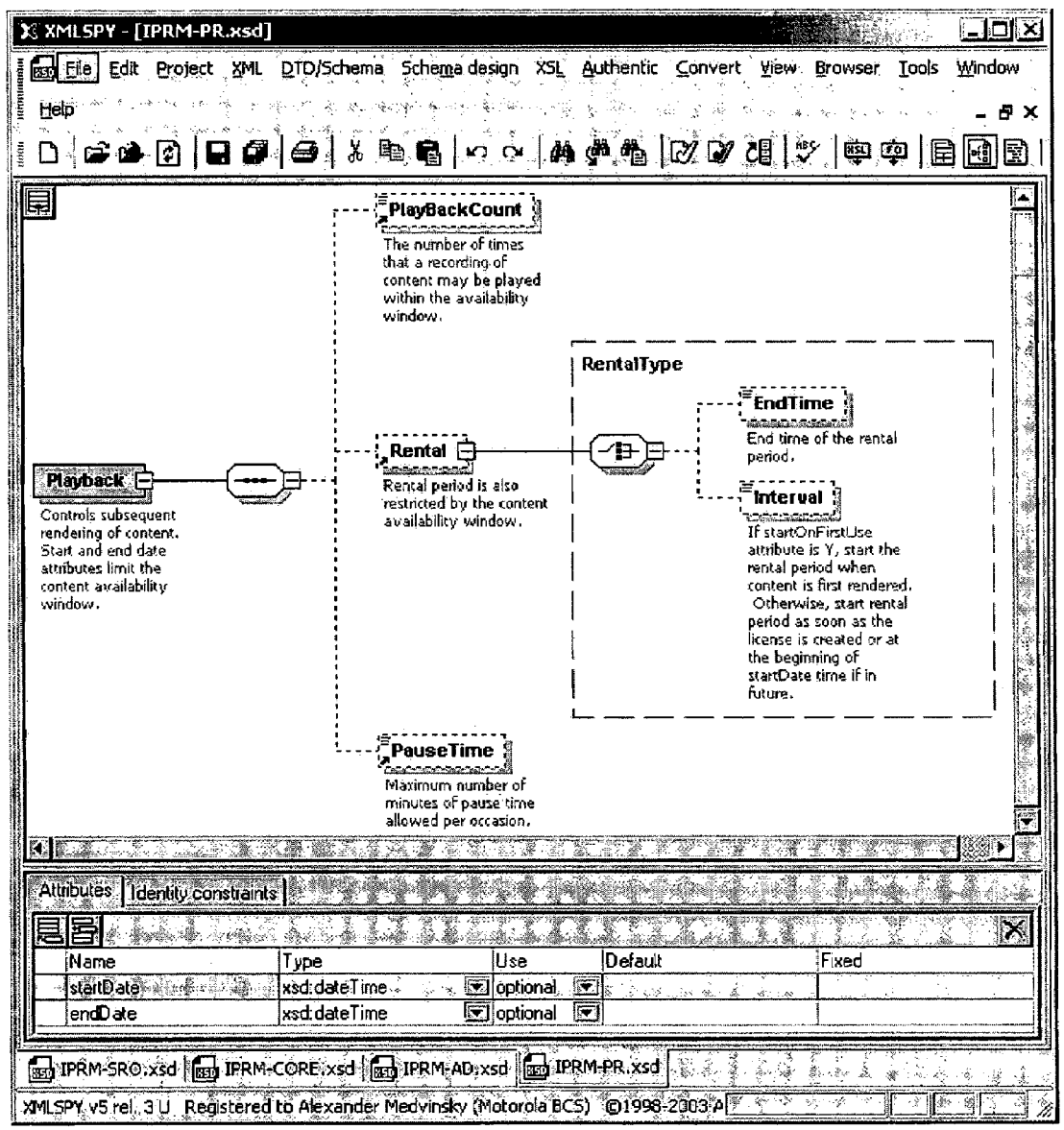
FIG. 12 depicts a Playback Element, which is part of an exemplary embodiment of a copyright protection scheme according to one aspect of the present invention.

The Playback element places restrictions on playback of stored content. It defines conditions which determine when stored content becomes expired and may no longer be used. The Playback element is illustrated in FIG. 12.

A Playback element has the following attributes (both optional):

startDate—the content cannot be accessed before this time.

endDate—the content cannot be accessed after this time.

A Playback element is a sequence of one or more of the following elements:

PlayBackCount—it is an integer value that specifies the maximum number of times that this content may be played back before it is considered to be expired. This element has an optional attribute maxDuration that limits the duration of each individual play back. When maxDuration is specified, a playback must be automatically terminated after the specified time period. The startDate and endDate attributes of the Playback element may be used in combination with this element. They would limit the period within which the content may be played in addition to the limit on the number of playbacks.

Rental—a choice between EndTime and Interval elements. EndTime is the expiration time for the content after which it must not be usable. Interval is a period of time within which the content is usable and has the following attribute:

StartOnFirstUse—a boolean flag. When set to "Y", it means that the rental interval doesn't start until the first time that the content is accessed, e.g., the first time that a decryption key for this content is retrieved from the content license. If this flag value is "N", the rental interval starts as soon as a content license is first created. Once a rental interval is started, the Rental element must be modified with the Interval replaced by EndTime, which is calculated as the starting time of the interval+Interval.

The startDate and endDate attributes of the Playback element may be used in combination with the Rental element and StartOnFirstUse set to "Y". They would provide an absolute time interval within which the content may be played in addition to the relative time limit on the period within which content playbacks may be started.

PauseTime—max number of minutes of pause time allowed per occasion.

What "occasion" means could vary between different rendering applications.

MulticastLimit

Limits the number of devices that the content can be simultaneously streamed to from a residential home gateway. This does not have to be an IP multicast. If the same content is being streamed to several clients simultaneously over multiple point-to-point connections, that would also qualify as a multicast in this case.

A value of 0 means that the number of such simultaneous devices is unrestricted. Each single multicast of the content is counted as a single playback.

Fingerprint

Identifies a fingerprint algorithm that is to be inserted into the content as it is being decompressed and delivered over an external analog or digital uncompressed interface. Several Fingerprint elements may be included in order to provide a choice to the rendering device. This element has the following attribute:

fingerprintID—an identifier for a fingerprint algorithm. Which fingerprint algorithms may be used is TBD. When the fingerprint algorithms are selected, it may become necessary to add some additional attributes to this element.

DeviceCapabilities

This element places some requirements on a device that is allowed to render or store a copy of this content. It has the following attributes:

SecurityLevelToRender—minimum security level of a device required to render this content. Currently 6 security levels have been defined for IPRM.
    SecurityLevelToCopy—minimum security level of a device required to save a copy of this content. In practice this security level will be greater or equal to SecurityLevelToRender.
    CodecInSecureHW—if this boolean flag is 'Y', a device is required to decompress this content within a secure hardware module.
    WatermarkInSecureHW—if this boolean flag is 'Y', a device is required to detect a watermark embedded in this content within a secure hardware module.
    FingerprintInSecureHW—if this boolean flag is 'Y', a device is required to insert a fingerprint into this content within a secure hardware module.

OptionCost Element

OptionCost is a sub-element of a RenewalOption and identifies the cost of using this option and this set of content usage rules to either renew a license or to buy a superdistributed copy of the content. The attributes of OptionCost are:

currency—currency used to specify the cost. A default value of "USD" identifies US dollars.
    format—format used to specify the value of the currency attribute, default is ISO4217 (a 3-letter achronym).

Figure 13:
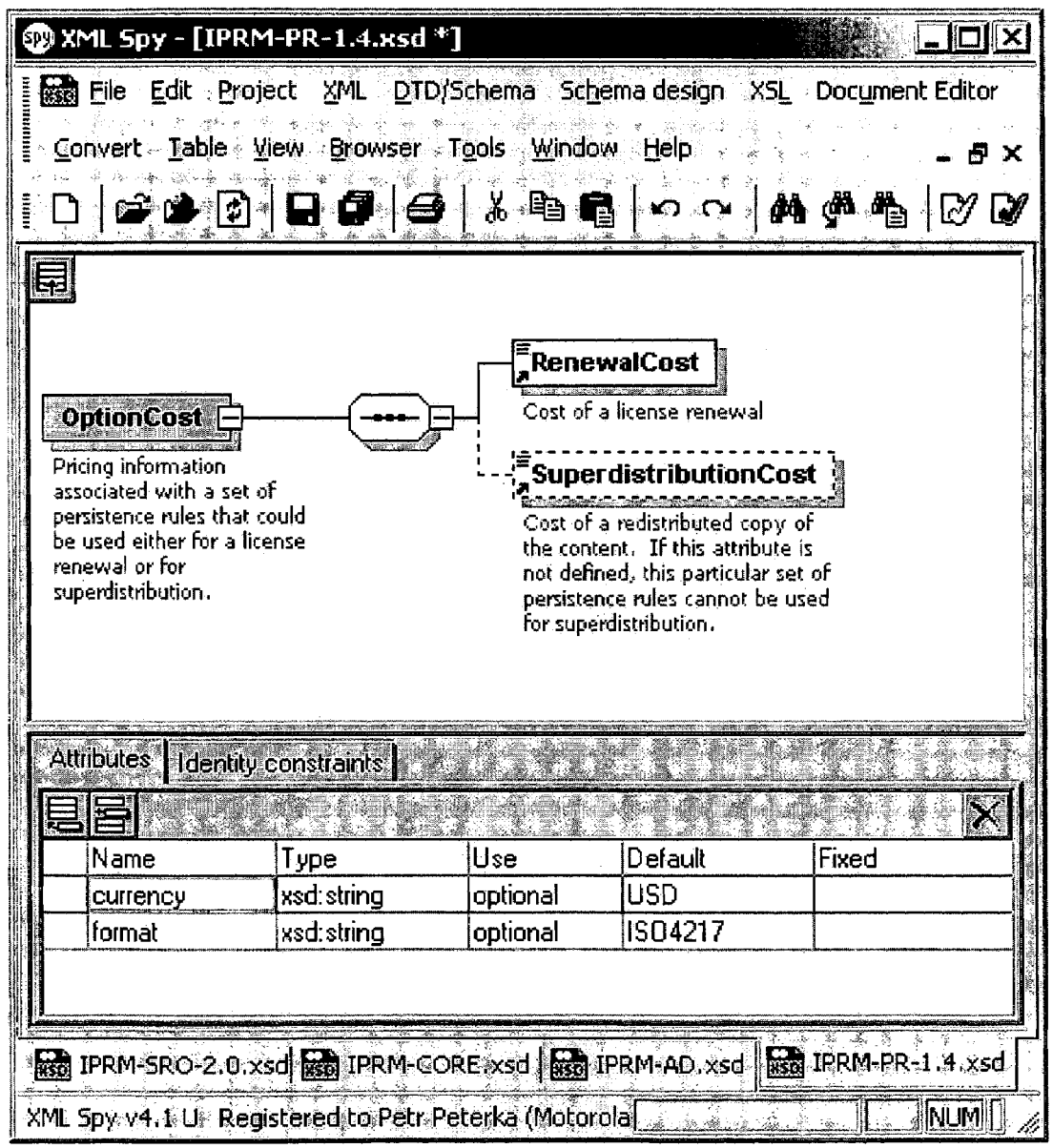
FIG. 13 depicts an Option Cost Element, which is part of an exemplary embodiment of a copyright protection scheme according to one aspect of the present invention.

The OptionCost element is illustrated in FIG. 13.

The OptionCost Element is a sequence of one or more of the following:

RenewalCost—the cost of renewing a license with this option that contains this set of content usage rules. This is a required element of the sequence.
    RedistributionCost—the cost of buying a superdistributed copy of the content using this option with this set of content usage rules. When this optional element is present, the same set of content usage rules may be used for both renewing a license and buying a superdistributed copy of the content. The price may be different in the two cases, e.g., you can get a bigger discount when renewing license to the content you already purchased. This element is optional as not all renewal options may also be used for superdistribution. There is currently no provision to have a set of content rules that may be used only for superdistribution but not for content renewal. If such need arises, in the future the RenewalCost could be made optional as well.

CopyProtectionRules Definition

Figure 14:
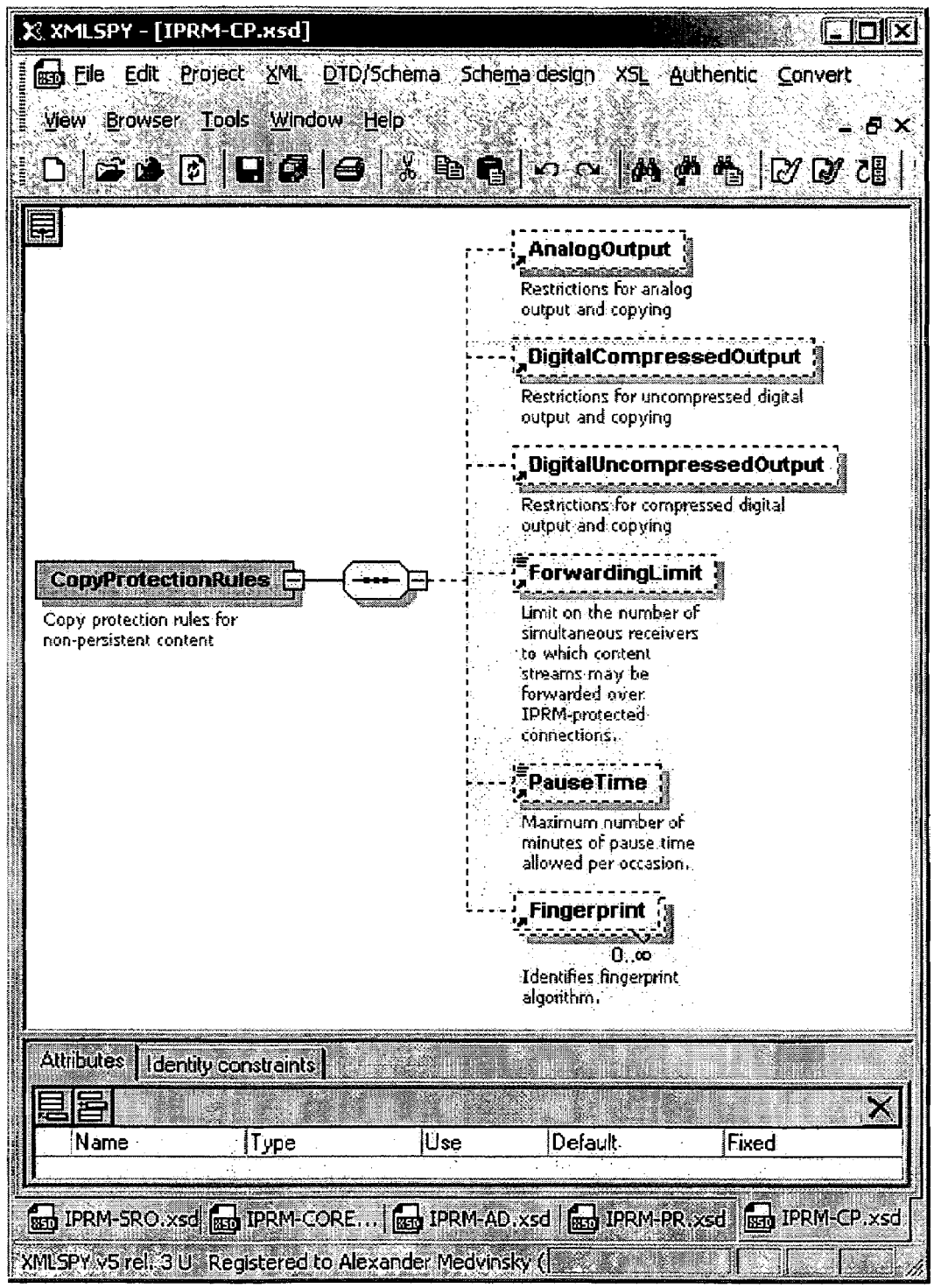
FIG. 14 depicts an IPRM Persistent Entitlements element, which is part of an exemplary embodiment of a copyright protection scheme according to one aspect of the present invention.

The CopyProtectionRules element is the root element of the IPRM Copy Protection Rules schema. It can either be utilized as a separate XML document that is included inside the SRO along with the Session Rights document, or it can be included directly inside the Session Rights as part of one of the PurchaseOption elements. This element contains copy protection rules associated with forwarding content over output ports and defines rules which are a subset of the rules in IPRMPersistentEntitlements, which is illustrated in FIG. 14.

CopyProtectionRules is a sequence of the following elements:

AnalogOutput—restricts copies over an analog interface as described above.
    DigitalCompressedOutput—restricts copies over a digital compressed interface as described above.
    DigitalUncompressedOutput—restricts copies over a digital uncompressed interface as described above.
    ForwardingLimit—limit on the number of simultaneous receivers to which content streams may be forwarded over IPRM-protected connections. The value of 0 means that content cannot be forwarded.
    PauseTime—maximum number of minutes of pause time allowed per occasion. What "occasion" means could vary between different rendering applications.
    Fingerprint—identifies a fingerprint algorithm that is to be inserted into the content as it is being decompressed and delivered over an external analog or digital uncompressed interface. Several Fingerprint elements may be included in order to provide a choice to the rendering device.

XML Schema

The following sections define the XML Schema for the above-described elements of the rights management language.

Core Schema

Defines common XML types and elements that may be used in several other IPRM schemas:

```xml
<?xml version="1.0" encoding="UTF-8"?>
<!-- edited with XMLSPY v5 rel. 3 U (http://www.xmlspy.com) by Alexander Medvinsky (Motorola BCS) -->
<xsd:schema targetNamespace="http://ppeterka1.w1.bcs.mot.com/xml"
xmlns:xsi="http://www.w3.org/2001/XMLSchema-instance" xmlns:xsd="http://www.w3.org/2001/XMLSchema"
xmlns="http://ppeterka1.w1.bcs.mot.com/xml" elementFormDefault="unqualified"
attributeFormDefault="unqualified" version="1.2">
    <xsd:notation name="IPRL-CORE" public="http://ppeterka1.w1.bcs.mot.com/xml">
        <xsd:annotation>
            <xsd:documentation>IPRM Rights Management Language, common definitions
</xsd:documentation>
        </xsd:annotation>
    </xsd:notation>
    <xsd:simpleType name="ShortBooleanType">
        <xsd:annotation>
```

```
<xsd:documentation>Yes/No answer</xsd:documentation>
    </xsd:annotation>
    <xsd:restriction base="xsd:NMTOKEN">
        <xsd:enumeration value="Y"/>
        <xsd:enumeration value="N"/>
    </xsd:restriction>
</xsd:simpleType>
<xsd:simpleType name="ShortDurationType">
    <xsd:annotation>
        <xsd:documentation>Excludes the year and month in xsd:duration type but keeps day, hour, minute and second, e.g. "P123DT12H46M53S"</xsd:documentation>
    </xsd:annotation>
    <xsd:restriction base="xsd:string">
        <xsd:pattern value="P([0-9]+D)?(T([0-9]+H)?([0-9]+M)?([0-9]+S)?)?"/>
    </xsd:restriction>
</xsd:simpleType>
<xsd:complexType name="DeviceCapabilityType">
    <xsd:annotation>
        <xsd:documentation>Security requirements on the destination device</xsd:documentation>
    </xsd:annotation>
    <xsd:attribute name="securityLevelToRender" type="xsd:byte" use="optional" default="1"/>
    <xsd:attribute name="securityLevelToCopy" type="xsd:byte" use="optional" default="1"/>
    <xsd:attribute name="codecInSecureHW" type="ShortBooleanType" use="optional" default="N"/>
    <xsd:attribute name="watermarkInSecureHW" type="ShortBooleanType" use="optional" default="N"/>
    <xsd:attribute name="fingerprintInSecureHW" type="ShortBooleanType" use="optional" default="N"/>
</xsd:complexType>
<xsd:complexType name="EntityType">
    <xsd:annotation>
        <xsd:documentation>Device identification</xsd:documentation>
    </xsd:annotation>
    <xsd:attribute name="id" type="xsd:string" use="optional"/>
```

```xml
<xsd:attribute name="realm" type="xsd:string" use="required"/>
</xsd:complexType>
<!--======================================= Financial definitions-->
<xsd:simpleType name="MoneyType">
    <xsd:annotation>
        <xsd:documentation>Monetary value</xsd:documentation>
    </xsd:annotation>
    <xsd:restriction base="xsd:float"/>
</xsd:simpleType>
<xsd:simpleType name="PaymentType">
    <xsd:annotation>
        <xsd:documentation>Type of purchase options</xsd:documentation>
    </xsd:annotation>
    <xsd:restriction base="xsd:NMTOKEN">
        <xsd:enumeration value="FREE"/>
        <xsd:enumeration value="SUBSCR"/>
        <xsd:enumeration value="ONE-TIME-PAY"/>
        <xsd:enumeration value="PBT"/>
    </xsd:restriction>
</xsd:simpleType>
<xsd:simpleType name="PayType">
    <xsd:annotation>
        <xsd:documentation>Type specifying ability to pay</xsd:documentation>
    </xsd:annotation>
    <xsd:restriction base="xsd:NMTOKENS">
        <xsd:enumeration value="INDIVIDUAL">
            <xsd:annotation>
                <xsd:documentation>This user is allowed to purchase PPV or PBT content individually</xsd:documentation>
            </xsd:annotation>
        </xsd:enumeration>
    </xsd:restriction>
</xsd:simpleType>
```

```xml
<xsd:complexType name="CurrencyType">
    <xsd:annotation>
        <xsd:documentation>Generic Price type that can specify different currencies</xsd:documentation>
    </xsd:annotation>
    <xsd:attribute name="currency" type="xsd:string" use="optional" default="USD"/>
    <xsd:attribute name="format" use="optional" default="ISO4217">
        <xsd:simpleType>
            <xsd:restriction base="xsd:string">
                <xsd:enumeration value="ISO4217"/>
            </xsd:restriction>
        </xsd:simpleType>
    </xsd:attribute>
</xsd:complexType>
<!--======================================= Ratings definitions-->
<xsd:simpleType name="GenericRatingType">
    <xsd:annotation>
        <xsd:documentation>Type representing a generic rating scheme</xsd:documentation>
    </xsd:annotation>
    <xsd:restriction base="xsd:NMTOKEN">
        <xsd:enumeration value="LEVEL0"/>
        <xsd:enumeration value="LEVEL1"/>
        <xsd:enumeration value="LEVEL2"/>
        <xsd:enumeration value="LEVEL3"/>
        <xsd:enumeration value="LEVEL4"/>
        <xsd:enumeration value="LEVEL5"/>
    </xsd:restriction>
</xsd:simpleType>
<xsd:element name="GenericRating" type="GenericRatingType">
    <xsd:annotation>
        <xsd:documentation>Generic rating element. It can be substituted by a specific rating scheme.</xsd:documentation>
    </xsd:annotation>
```

```xml
</xsd:element>
<xsd:simpleType name="TvRatingType">
    <xsd:annotation>
        <xsd:documentation>Type representing North American TV Rating scheme</xsd:documentation>
    </xsd:annotation>
    <xsd:restriction base="xsd:NMTOKEN">
        <xsd:enumeration value="NONE"/>
        <xsd:enumeration value="TV-Y"/>
        <xsd:enumeration value="TV-Y7"/>
        <xsd:enumeration value="TV-G"/>
        <xsd:enumeration value="TV-PG"/>
        <xsd:enumeration value="TV-14"/>
        <xsd:enumeration value="TV-M"/>
    </xsd:restriction>
</xsd:simpleType>
<xsd:element name="TvRating" type="TvRatingType" substitutionGroup="GenericRating">
    <xsd:annotation>
        <xsd:documentation>North American TV Rating substituting an abstract aRating element</xsd:documentation>
    </xsd:annotation>
</xsd:element>
<xsd:simpleType name="MPAARatingType">
    <xsd:annotation>
        <xsd:documentation>Type representing MPAA Rating scheme</xsd:documentation>
    </xsd:annotation>
    <xsd:restriction base="xsd:NMTOKEN">
        <xsd:enumeration value="NA"/>
        <xsd:enumeration value="G"/>
        <xsd:enumeration value="PG"/>
        <xsd:enumeration value="PG-13"/>
        <xsd:enumeration value="R"/>
        <xsd:enumeration value="NC-17"/>
```

```
            <xsd:enumeration value="NR"/>
        </xsd:restriction>
    </xsd:simpleType>
    <xsd:element name="MPAARating" type="MPAARatingType" substitutionGroup="GenericRating">
        <xsd:annotation>
            <xsd:documentation>MPAA Rating substituting an abstract aRating element</xsd:documentation>
        </xsd:annotation>
    </xsd:element>
    <xsd:simpleType name="DVBRatingType">
        <xsd:annotation>
            <xsd:documentation>DVB Rating type - minimum viewing age between 3 and 18</xsd:documentation>
        </xsd:annotation>
        <xsd:restriction base="xsd:unsignedByte">
            <xsd:minInclusive value="3"/>
            <xsd:maxInclusive value="18"/>
        </xsd:restriction>
    </xsd:simpleType>
    <xsd:element name="DVBRating" type="DVBRatingType" substitutionGroup="GenericRating">
        <xsd:annotation>
            <xsd:documentation>DVB Rating - minimum viewing age between 3 and 18</xsd:documentation>
        </xsd:annotation>
    </xsd:element>
    <!--===================================== Fingerprint definitions-->
    <xsd:complexType name="FingerprintType">
        <xsd:annotation>
            <xsd:documentation>Identifies fingerprint algorithm.</xsd:documentation>
        </xsd:annotation>
        <xsd:attribute name="fingerprintID" type="xsd:short" use="required"/>
    </xsd:complexType>
    <xsd:complexType name="FingerprintListType">
```

```xml
<xsd:annotation>
    <xsd:documentation>If attribute 'secretAlgAtSource' is 'Y', content source must insert the fingerprint and it must use an algorithm that is not supported by the destination.</xsd:documentation>
</xsd:annotation>
<xsd:sequence>
    <xsd:element ref="Fingerprint" maxOccurs="unbounded"/>
</xsd:sequence>
<xsd:attribute name="secretAlgAtSource" type="ShortBooleanType" use="optional" default="N"/>
</xsd:complexType>
<xsd:element name="Fingerprint" type="FingerprintType">
    <xsd:annotation>
        <xsd:documentation>Identifies fingerprint algorithm.</xsd:documentation>
    </xsd:annotation>
</xsd:element>
<!--======================================= Location definitions-->
<xsd:simpleType name="CountryFormatType">
    <xsd:annotation>
        <xsd:documentation>Specifies format of a country code.</xsd:documentation>
    </xsd:annotation>
    <xsd:restriction base="xsd:NMTOKEN">
        <xsd:enumeration value="ISO3166"/>
    </xsd:restriction>
</xsd:simpleType>
<xsd:element name="aLocation" abstract="true">
    <xsd:annotation>
        <xsd:documentation>Abstract placeholder for specific location definition model</xsd:documentation>
    </xsd:annotation>
</xsd:element>
<xsd:complexType name="CountryType">
    <xsd:annotation>
        <xsd:documentation>Defines a location in the terms of a list of countries abbreviation</xsd:documentation>
```

```xml
<xsd:annotation>
    <xsd:documentation>DVD region code (1 thru 8)</xsd:documentation>
</xsd:annotation>
<xsd:restriction base="xsd:unsignedByte">
    <xsd:minInclusive value="1"/>
    <xsd:maxInclusive value="8"/>
</xsd:restriction>
</xsd:simpleType>
<xsd:simpleType name="DVDRegionListType">
    <xsd:annotation>
        <xsd:documentation>A space-separated list of DVD region codes</xsd:documentation>
    </xsd:annotation>
    <xsd:list itemType="DVDRegionType"/>
</xsd:simpleType>
<xsd:element name="DVDRegion" type="DVDRegionListType" substitutionGroup="aLocation">
    <xsd:annotation>
        <xsd:documentation>Location specified by a list of DVD region codes</xsd:documentation>
    </xsd:annotation>
</xsd:element>
<xsd:group name="LocationGroup">
    <xsd:annotation>
        <xsd:documentation>Location with a determination whether it is an access point or not</xsd:documentation>
    </xsd:annotation>
    <xsd:sequence>
        <xsd:element ref="aLocation"/>
        <xsd:element name="AccessPoint" type="ShortBooleanType" default="Y" minOccurs="0">
            <xsd:annotation>
                <xsd:documentation>Determines whether this location is an access point or not (i.e. whether this device can obtain content from the outside network)</xsd:documentation>
            </xsd:annotation>
        </xsd:element>
    </xsd:sequence>
```

```xml
</xsd:group>
<xsd:complexType name="LocationListType">
    <xsd:annotation>
        <xsd:documentation>List of locations</xsd:documentation>
    </xsd:annotation>
    <xsd:sequence>
        <xsd:element ref="aLocation" maxOccurs="unbounded"/>
    </xsd:sequence>
</xsd:complexType>
<xsd:complexType name="BlackoutType">
    <xsd:annotation>
        <xsd:documentation>Either the content access is denied at these specified locations or the content can only be accessed at these locations.</xsd:documentation>
    </xsd:annotation>
    <xsd:complexContent>
        <xsd:extension base="LocationListType">
            <xsd:attribute name="restriction" use="optional" default="IN">
                <xsd:simpleType>
                    <xsd:restriction base="xsd:NMTOKEN">
                        <xsd:enumeration value="IN"/>
                        <xsd:enumeration value="OUT"/>
                    </xsd:restriction>
                </xsd:simpleType>
            </xsd:attribute>
        </xsd:extension>
    </xsd:complexContent>
</xsd:complexType>
<!--===================================== Subscription definitions-->
<xsd:simpleType name="ServiceIDList">
    <xsd:annotation>
        <xsd:documentation>list of service identifiers (2 bytes each)</xsd:documentation>
    </xsd:annotation>
    <xsd:list itemType="xsd:unsignedShort"/>
```

```
</xsd:simpleType>
<xsd:simpleType name="ProviderServiceList">
    <xsd:annotation>
        <xsd:documentation>list of concatenated provider and service identifiers (2 bytes for provider, 2 bytes for service)</xsd:documentation>
    </xsd:annotation>
    <xsd:list itemType="xsd:unsignedInt"/>
</xsd:simpleType>
<xsd:element name="aSubscription" abstract="true">
    <xsd:annotation>
        <xsd:documentation> Abstract placeholder for specific subscription definition model</xsd:documentation>
    </xsd:annotation>
</xsd:element>
<xsd:complexType name="SubscriptionNamesType">
    <xsd:annotation>
        <xsd:documentation>Type defining a list of service names optionally identified by a provider</xsd:documentation>
    </xsd:annotation>
    <xsd:simpleContent>
        <xsd:extension base="xsd:NMTOKENS">
            <xsd:attribute name="provider" type="xsd:NMTOKEN" use="optional"/>
        </xsd:extension>
    </xsd:simpleContent>
</xsd:complexType>
<xsd:element name="SubscriptionName" type="SubscriptionNamesType" substitutionGroup="aSubscription">
    <xsd:annotation>
        <xsd:documentation>List of subscription service names</xsd:documentation>
    </xsd:annotation>
</xsd:element>
<xsd:complexType name="SubscriptionIDsType">
    <xsd:annotation>
```

```xml
<xsd:documentation>Type defining a list of service IDs optionally identified by a provider</xsd:documentation>
        </xsd:annotation>
        <xsd:simpleContent>
            <xsd:extension base="ServiceIDList">
                <xsd:attribute name="provider" type="xsd:unsignedShort" use="optional"/>
            </xsd:extension>
        </xsd:simpleContent>
    </xsd:complexType>
    <xsd:element name="SubscriptionID" type="SubscriptionIDsType" substitutionGroup="aSubscription">
        <xsd:annotation>
            <xsd:documentation>List of subscription IDs</xsd:documentation>
        </xsd:annotation>
    </xsd:element>
    <xsd:complexType name="SubscriptionNumbersType">
        <xsd:annotation>
            <xsd:documentation>Type defining a list of provider/service IDs</xsd:documentation>
        </xsd:annotation>
        <xsd:simpleContent>
            <xsd:extension base="ProviderServiceList"/>
        </xsd:simpleContent>
    </xsd:complexType>
    <xsd:element name="SubscriptionNumber" type="SubscriptionNumbersType" substitutionGroup="aSubscription">
        <xsd:annotation>
            <xsd:documentation>List of provider/service IDs</xsd:documentation>
        </xsd:annotation>
    </xsd:element>
    <xsd:complexType name="SubscriptionType">
        <xsd:annotation>
            <xsd:documentation>A subscription type and replacement hierarchy</xsd:documentation>
        </xsd:annotation>
        <xsd:sequence>
```

```xml
            <xsd:element ref="aSubscription" maxOccurs="unbounded"/>
        </xsd:sequence>
</xsd:complexType>
<!--======================================== Copy protection definitions-->
<xsd:simpleType name="SplitColorBurstLinesType">
    <xsd:annotation>
        <xsd:documentation>Analog copy protection attributes</xsd:documentation>
    </xsd:annotation>
    <xsd:restriction base="xsd:NMTOKEN">
        <xsd:enumeration value="N">
            <xsd:annotation>
                <xsd:documentation>Split color burst is off</xsd:documentation>
            </xsd:annotation>
        </xsd:enumeration>
        <xsd:enumeration value="2"/>
        <xsd:enumeration value="4"/>
    </xsd:restriction>
</xsd:simpleType>
<xsd:simpleType name="CGMSType">
    <xsd:annotation>
        <xsd:documentation>Copy count type</xsd:documentation>
    </xsd:annotation>
    <xsd:restriction base="xsd:NMTOKEN">
        <xsd:enumeration value="UNLIMITED"/>
        <xsd:enumeration value="NOCOPY"/>
        <xsd:enumeration value="NOMORE"/>
        <xsd:enumeration value="ONEGENERATION"/>
    </xsd:restriction>
</xsd:simpleType>
<xsd:complexType name="AnalogCopyProtectionType">
    <xsd:annotation>
        <xsd:documentation>Analog copy protection attributes</xsd:documentation>
    </xsd:annotation>
```

```
            <xsd:attributeGroup ref="CopyProtectionType"/>
            <xsd:attribute name="componentOutput" type="ShortBooleanType" use="optional" default="N"/>
            <xsd:attribute name="outputAllowed" type="ShortBooleanType" use="optional" default="Y"/>
            <xsd:attribute name="pseudoSyncPulse" type="ShortBooleanType" use="optional" default="N"/>
            <xsd:attribute name="splitColorBurst" type="SplitColorBurstLinesType" use="optional"
default="N"/>
            <xsd:attribute name="constrainedImage" type="xsd:integer" use="optional" default="0">
                <xsd:annotation>
                    <xsd:documentation>0 indicates no constraint, 1 indicates pre-defined constraint, and a
positive integer number indicates maximum number of horizontal pixels. </xsd:documentation>
                </xsd:annotation>
            </xsd:attribute>
            <xsd:attribute name="constrainedAudio" type="xsd:integer" use="optional" default="0">
                <xsd:annotation>
                    <xsd:documentation>0 indicates no constraint, 1 indicates pre-defined constraint, and a
positive integer number indicates maximum bit rate in Kbits/sec.</xsd:documentation>
                </xsd:annotation>
            </xsd:attribute>
            <xsd:attribute name="audioChannelLimit" type="xsd:integer" use="optional" default="0">
                <xsd:annotation>
                    <xsd:documentation>0 indicates no limit, a positive integer indicates the maximum number
of audio channels allowed.</xsd:documentation>
                </xsd:annotation>
            </xsd:attribute>
        </xsd:complexType>
        <xsd:complexType name="DigitalCopyProtectionType">
            <xsd:annotation>
                <xsd:documentation>Digital copy protection attributes</xsd:documentation>
            </xsd:annotation>
            <xsd:attributeGroup ref="CopyProtectionType"/>
            <xsd:attribute name="outputAllowed" type="ShortBooleanType" use="optional" default="N"/>
        </xsd:complexType>
        <xsd:attributeGroup name="CopyProtectionType">
```

```xml
<xsd:annotation>
    <xsd:documentation>Common copy protection attributes</xsd:documentation>
</xsd:annotation>
<xsd:attribute name="copyRestriction" type="CGMSType" use="optional" default="NOCOPY"/>
<xsd:attribute name="numberOfCopies" type="xsd:byte" use="optional" default="0">
    <xsd:annotation>
        <xsd:documentation>When copyRestriction attribute is set to ONEGENERATION, this attribute adds a further restriction on how many copies can be made from the original copy. If this attribute is not present or if its value is 0, there is no limit on number of copies made from the original (but each copy made becomes COPYNOMORE).</xsd:documentation>
    </xsd:annotation>
</xsd:attribute>
</xsd:attributeGroup>

<xsd:element name="AnalogOutput" type="AnalogCopyProtectionType">
    <xsd:annotation>
        <xsd:documentation>Restrictions for analog output and copying</xsd:documentation>
    </xsd:annotation>
</xsd:element>
<xsd:element name="DigitalCompressedOutput" type="DigitalCopyProtectionType">
    <xsd:annotation>
        <xsd:documentation>Restrictions for uncompressed digital output and copying</xsd:documentation>
    </xsd:annotation>
</xsd:element>
<xsd:element name="DigitalUncompressedOutput" type="DigitalCopyProtectionType">
    <xsd:annotation>
        <xsd:documentation>Restrictions for compressed digital output and copying</xsd:documentation>
    </xsd:annotation>
</xsd:element>
<xsd:element name="PauseTime" type="ShortDurationType" default="PT1H30M">
    <xsd:annotation>
```

```
            <xsd:documentation>Maximum number of minutes of pause time allowed per
occasion.</xsd:documentation>
        </xsd:annotation>
    </xsd:element>
    <xsd:element name="GenericRights">
        <xsd:annotation>
            <xsd:documentation>Placeholder for content usage rules.  An empty element of this type can
be included in SRO to indicate that content usage rules are described in another document.</xsd:documentation>
        </xsd:annotation>
    </xsd:element>
</xsd:schema>
```

Session Rights Schema

```
<?xml version="1.0" encoding="UTF-8"?>
<!-- edited with XMLSPY v5 rel. 3 U (http://www.xmlspy.com) by Alexander Medvinsky (Motorola BCS) -->
<xsd:schema targetNamespace="http://ppeterka1.w1.bcs.mot.com/xml"
xmlns="http://ppeterka1.w1.bcs.mot.com/xml" xmlns:xsd="http://www.w3.org/2001/XMLSchema"
elementFormDefault="unqualified" attributeFormDefault="unqualified" version="2.0">
    <xsd:include schemaLocation="http://ppeterka1.w1.bcs.mot.com/xml/IPRM-CP.xsd"/>
    <!--<xsd:include schemaLocation="C:/Documents and Settings/smedvins/My
Documents/IPRM/XML/IPRM-CP.xsd"/>-->
    <xsd:include schemaLocation="http://ppeterka1.w1.bcs.mot.com/xml/IPRM-PR.xsd"/>
    <!--<xsd:include schemaLocation="C:/Documents and Settings/smedvins/My
Documents/IPRM/XML/IPRM-PR.xsd"/>-->
    <xsd:notation name="IPRL-SR" public="http://ppeterka1.w1.bcs.mot.com/xml">
        <xsd:annotation>
            <xsd:documentation>IPRM Rights Management Language for content access rules
</xsd:documentation>
        </xsd:annotation>
    </xsd:notation>
    <xsd:element name="Rights">
        <xsd:annotation>
            <xsd:documentation>IPRM Session Rights definition</xsd:documentation>
```

```xml
</xsd:annotation>
<xsd:complexType>
    <xsd:sequence>
        <xsd:element ref="Content"/>
        <xsd:element ref="Provider" minOccurs="0"/>
        <xsd:element ref="Rule" minOccurs="0"/>
        <xsd:element ref="Selection"/>
    </xsd:sequence>
</xsd:complexType>
</xsd:element>
<xsd:element name="Rule">
    <xsd:annotation>
        <xsd:documentation>Specific access rules for a given content use</xsd:documentation>
    </xsd:annotation>
    <xsd:complexType>
        <xsd:complexContent>
            <xsd:extension base="RuleType">
                <xsd:attribute name="extern" type="xsd:boolean" use="optional" default="false">
                    <xsd:annotation>
                        <xsd:documentation>Determines whether user selection (Selection element) can be provided in a separate XML document.</xsd:documentation>
                    </xsd:annotation>
                </xsd:attribute>
            </xsd:extension>
        </xsd:complexContent>
    </xsd:complexType>
</xsd:element>
<xsd:element name="Selection">
    <xsd:annotation>
        <xsd:documentation>Selection made by a particular user</xsd:documentation>
    </xsd:annotation>
    <xsd:complexType>
        <xsd:sequence>
```

```xml
        </xsd:annotation>
        <xsd:simpleContent>
            <xsd:extension base="xsd:NMTOKENS">
                <xsd:attribute name="format" type="CountryFormatType" use="optional" default="ISO3166"/>
            </xsd:extension>
        </xsd:simpleContent>
    </xsd:complexType>
    <xsd:element name="Country" type="CountryType" substitutionGroup="aLocation">
        <xsd:annotation>
            <xsd:documentation>Country location</xsd:documentation>
        </xsd:annotation>
    </xsd:element>
    <xsd:complexType name="PostalCodeType">
        <xsd:annotation>
            <xsd:documentation>Defines a location in the terms of a list of postal codes</xsd:documentation>
        </xsd:annotation>
        <xsd:simpleContent>
            <xsd:extension base="xsd:NMTOKENS">
                <xsd:attribute name="long" type="ShortBooleanType" use="optional" default="N"/>
                <xsd:attribute name="format" type="CountryFormatType" use="optional" default="ISO3166"/>
                <xsd:attribute name="country" type="xsd:token" use="optional" default="US"/>
            </xsd:extension>
        </xsd:simpleContent>
    </xsd:complexType>
    <xsd:element name="PostalCode" type="PostalCodeType" substitutionGroup="aLocation">
        <xsd:annotation>
            <xsd:documentation>Postal code location (e.g. ZIP code in US)</xsd:documentation>
        </xsd:annotation>
    </xsd:element>
    <xsd:simpleType name="DVDRegionType">
```

```xml
<xsd:element ref="Payment"/>
<xsd:element ref="Override" minOccurs="0"/>
</xsd:sequence>
<xsd:attribute name="extern" type="xsd:boolean" use="optional" default="false">
    <xsd:annotation>
        <xsd:documentation>Determines whether content access rules (Rule element) can be provided in a separate XML document.</xsd:documentation>
    </xsd:annotation>
</xsd:attribute>
<xsd:attribute name="optionID" type="xsd:IDREF" use="required"/>
<xsd:attribute name="deviceBound" type="ShortBooleanType" use="optional">
    <xsd:annotation>
        <xsd:documentation>If Y(es), the content will not be shared outside the access device. If N(o), then the content will be shared across user's authorized domain. If this attribute is not specified, need to check persistent content entitlements to find out. This attribute has implications on how the blackout rules are validated.</xsd:documentation>
    </xsd:annotation>
</xsd:attribute>
</xsd:complexType>
</xsd:element>
<xsd:element name="Payment" type="PaymentType">
    <xsd:annotation>
        <xsd:documentation>Selected payment type for the content</xsd:documentation>
    </xsd:annotation>
</xsd:element>
<xsd:element name="Override" type="OverrideType">
    <xsd:annotation>
        <xsd:documentation>Access rule override based on user confirmation</xsd:documentation>
    </xsd:annotation>
</xsd:element>
<xsd:element name="Provider">
    <xsd:annotation>
        <xsd:documentation>Content provider</xsd:documentation>
```

```xml
        </xsd:annotation>
        <xsd:complexType>
            <xsd:simpleContent>
                <xsd:extension base="xsd:string">
                    <xsd:attribute name="pid" type="xsd:short" use="required">
                        <xsd:annotation>
                            <xsd:documentation>Provider Identification</xsd:documentation>
                        </xsd:annotation>
                    </xsd:attribute>
                </xsd:extension>
            </xsd:simpleContent>
        </xsd:complexType>
    </xsd:element>
    <xsd:element name="Cost">
        <xsd:annotation>
            <xsd:documentation>Payment option and an associated price for the content</xsd:documentation>
        </xsd:annotation>
        <xsd:complexType>
            <xsd:complexContent>
                <xsd:extension base="CurrencyType">
                    <xsd:sequence>
                        <xsd:element ref="OneTimePay" minOccurs="0"/>
                        <xsd:element ref="PBT" minOccurs="0"/>
                    </xsd:sequence>
                </xsd:extension>
            </xsd:complexContent>
        </xsd:complexType>
    </xsd:element>
    <xsd:element name="OneTimePay">
        <xsd:annotation>
            <xsd:documentation>Pay separately for each purchase (no subscription)</xsd:documentation>
        </xsd:annotation>
```

```xml
        <xsd:complexType>
            <xsd:attribute name="price" type="MoneyType" use="required"/>
        </xsd:complexType>
    </xsd:element>
    <xsd:element name="PBT">
        <xsd:annotation>
            <xsd:documentation>Pay-by-time price value is the cost of each started time period defined by the increment attribute in minutes. </xsd:documentation>
        </xsd:annotation>
        <xsd:complexType>
            <xsd:attribute name="increment" type="xsd:positiveInteger" use="optional" default="30"/>
            <xsd:attribute name="price" type="MoneyType" use="required"/>
        </xsd:complexType>
    </xsd:element>
    <xsd:element name="Blackout">
        <xsd:annotation>
            <xsd:documentation>List of locations with limited access to the content </xsd:documentation>
        </xsd:annotation>
        <xsd:complexType>
            <xsd:complexContent>
                <xsd:extension base="BlackoutType">
                    <xsd:attribute name="buyThru" type="xsd:boolean" use="optional" default="false">
                        <xsd:annotation>
                            <xsd:documentation>If this attribute is true, the user can buy through the blackout (using the One-Time-Pay price).</xsd:documentation>
                        </xsd:annotation>
                    </xsd:attribute>
                </xsd:extension>
            </xsd:complexContent>
        </xsd:complexType>
    </xsd:element>
    <xsd:element name="Content">
        <xsd:annotation>
```

```xml
<xsd:documentation>Content description and identification</xsd:documentation>
</xsd:annotation>
<xsd:complexType>
    <xsd:simpleContent>
        <xsd:extension base="xsd:string">
            <xsd:attribute name="format" use="optional" default="URI">
                <xsd:simpleType>
                    <xsd:restriction base="xsd:NMTOKEN">
                        <xsd:enumeration value="URI"/>
                        <xsd:enumeration value="ISBN"/>
                    </xsd:restriction>
                </xsd:simpleType>
            </xsd:attribute>
            <xsd:attribute name="id" type="xsd:string" use="required">
                <xsd:annotation>
                    <xsd:documentation>Content identifier in the format specified by the 'format' attribute.</xsd:documentation>
                </xsd:annotation>
            </xsd:attribute>
            <xsd:attribute name="protected" type="ShortBooleanType" use="optional" default="Y">
                <xsd:annotation>
                    <xsd:documentation>Specifies whether this content is protected (e.g. encrypted) or not.</xsd:documentation>
                </xsd:annotation>
            </xsd:attribute>
        </xsd:extension>
    </xsd:simpleContent>
</xsd:complexType>
</xsd:element>
<xsd:simpleType name="OverrideType">
    <xsd:annotation>
        <xsd:documentation>Access rule override</xsd:documentation>
    </xsd:annotation>
```

```xml
<xsd:restriction base="xsd:NMTOKENS">
    <xsd:enumeration value="RATING"/>
</xsd:restriction>
</xsd:simpleType>
<xsd:complexType name="RuleType">
    <xsd:annotation>
        <xsd:documentation>Distribution and access rules</xsd:documentation>
    </xsd:annotation>
    <xsd:sequence>
        <xsd:element ref="PurchaseOption" maxOccurs="unbounded"/>
        <xsd:element ref="Blackout" minOccurs="0"/>
        <xsd:element ref="GenericRating" minOccurs="0" maxOccurs="unbounded"/>
        <xsd:element ref="Fingerprint" minOccurs="0" maxOccurs="unbounded"/>
        <xsd:element ref="DeviceCapabilities" minOccurs="0"/>
    </xsd:sequence>
</xsd:complexType>
<xsd:group name="SubscriptionGroup">
    <xsd:annotation>
        <xsd:documentation>identifies one or more subscription services and associated incremental cost (if any) of the content</xsd:documentation>
    </xsd:annotation>
    <xsd:sequence>
        <xsd:element ref="aSubscription"/>
        <xsd:element ref="IncrementalCost" minOccurs="0"/>
    </xsd:sequence>
</xsd:group>
<xsd:element name="PurchaseOption">
    <xsd:annotation>
        <xsd:documentation>One of the options for purchasing content, including persistent or non-persistent copy protection/DRM rules.</xsd:documentation>
    </xsd:annotation>
    <xsd:complexType>
        <xsd:sequence>
```

```
            <xsd:element ref="GenericRights"/>

<xsd:element ref="Cost" minOccurs="0"/>

<xsd:group ref="SubscriptionGroup" minOccurs="0" maxOccurs="unbounded"/>

</xsd:sequence>

<xsd:attribute name="optionID" type="xsd:ID" use="required"/>

</xsd:complexType>

</xsd:element>

<xsd:element name="IncrementalCost">

<xsd:annotation>

<xsd:documentation>Incremental cost for content when purchased under subscription</xsd:documentation>

</xsd:annotation>

<xsd:complexType>

<xsd:complexContent>

<xsd:extension base="CurrencyType">

<xsd:attribute name="price" type="MoneyType" use="required"/>

</xsd:extension>

</xsd:complexContent>

</xsd:complexType>

</xsd:element>

</xsd:schema>
```

User Authorization Schema

```
<?xml version="1.0" encoding="UTF-8"?>
<!-- edited with XMLSPY v5 rel. 2 U (http://www.xmlspy.com) by Petr Peterka (Motorola BCS) -->
<!-- edited with XML Spy v4.1 U (http://www.xmlspy.com) by Petr Peterka (Motorola) -->
<xsd:schema targetNamespace="http://ppeterka1.w1.bcs.mot.com/xml" xmlns="http://ppeterka1.w1.bcs.mot.com/xml" xmlns:xsd="http://www.w3.org/2001/XMLSchema" elementFormDefault="unqualified" attributeFormDefault="unqualified" version="1.5">

<xsd:include schemaLocation="http://ppeterka1.w1.bcs.mot.com/xml/IPRM-CORE.xsd"/>

<!-- <xsd:include schemaLocation="C:/Documents and Settings/smedvins/My Documents/IPRM/XML/IPRM-CORE-1.1.xsd"/>-->

<xsd:notation name="IPRL-AD" public="http://ppeterka1.w1.bcs.mot.com/xml">
```

```xml
<xsd:annotation>
    <xsd:documentation>IPRM Rights Management Language for user authorization</xsd:documentation>
</xsd:annotation>
</xsd:notation>
<xsd:element name="Authorization">
    <xsd:annotation>
        <xsd:documentation>User Authorization Data containing user's entitlements and related attributes</xsd:documentation>
    </xsd:annotation>
    <xsd:complexType>
        <xsd:sequence minOccurs="0">
            <xsd:element ref="Pay" minOccurs="0"/>
            <xsd:group ref="LocationGroup" minOccurs="0" maxOccurs="unbounded"/>
            <xsd:element ref="aSubscription" minOccurs="0" maxOccurs="unbounded"/>
            <xsd:element ref="GenericRating" minOccurs="0" maxOccurs="unbounded"/>
        </xsd:sequence>
        <xsd:attribute name="principal" type="xsd:string" use="required"/>
        <xsd:attribute name="operator" type="xsd:string" use="optional"/>
    </xsd:complexType>
</xsd:element>
<xsd:element name="Pay" type="PayType">
    <xsd:annotation>
        <xsd:documentation>User's ability to pay. If not specified, user will be entitled to free content only. </xsd:documentation>
    </xsd:annotation>
</xsd:element>
</xsd:schema>
```

Persistent Entitlements Schema

```xml
<?xml version="1.0" encoding="UTF-8"?>
<!-- edited with XMLSPY v5 rel. 3 U (http://www.xmlspy.com) by Alexander Medvinsky (Motorola BCS) -->
```

```xml
<xsd:schema targetNamespace="http://ppeterka1.w1.bcs.mot.com/xml"
xmlns="http://ppeterka1.w1.bcs.mot.com/xml" xmlns:xsd="http://www.w3.org/2001/XMLSchema"
elementFormDefault="unqualified" attributeFormDefault="unqualified" version="1.6">
    <xsd:include schemaLocation="http://ppeterka1.w1.bcs.mot.com/xml/IPRM-CORE.xsd"/>
    <!--<xsd:include schemaLocation="C:/Documents and Settings/smedvins/My Documents/IPRM/XML/IPRM-CORE.xsd"/>-->
    <xsd:notation name="IPRL-PR" public="http://ppeterka1.w1.bcs.mot.com/xml">
        <xsd:annotation>
            <xsd:documentation>IPRM Rights Management Language for persistent content rights based on Extended CCI (ExCCI) </xsd:documentation>
        </xsd:annotation>
    </xsd:notation>
    <xsd:element name="PersistentEntitlements" substitutionGroup="GenericRights">
        <xsd:annotation>
            <xsd:documentation>Restrictions on handling of saved copy of this content. Also, restrictions on redirecting received content to client's analog/digital outputs.</xsd:documentation>
        </xsd:annotation>
        <xsd:complexType>
            <xsd:sequence>
                <xsd:element ref="RuleSet"/>
                <xsd:element name="RenewalOption" type="RenewalOptionType" minOccurs="0" maxOccurs="unbounded">
                    <xsd:annotation>
                        <xsd:documentation>A set of persistent content rules and pricing information that could be used for license renewal or content redistribution.</xsd:documentation>
                    </xsd:annotation>
                </xsd:element>
                <xsd:element ref="Copyright" minOccurs="0"/>
            </xsd:sequence>
            <xsd:attribute name="renewal" type="ShortBooleanType" use="optional" default="N"/>
            <xsd:attribute name="superdistribution" type="ShortBooleanType" use="optional" default="N"/>
        </xsd:complexType>
    </xsd:element>
```

```xml
<xsd:simpleType name="PlayBackCountType">
    <xsd:annotation>
        <xsd:documentation>Number of times the content can be played back</xsd:documentation>
    </xsd:annotation>
    <xsd:restriction base="xsd:positiveInteger"/>
</xsd:simpleType>
<xsd:complexType name="StoredContentRuleSetType">
    <xsd:annotation>
        <xsd:documentation>a single set of restrictions on handling of saved copy of this content</xsd:documentation>
    </xsd:annotation>
    <xsd:sequence>
        <xsd:element ref="AnalogOutput" minOccurs="0"/>
        <xsd:element ref="DigitalCompressedOutput" minOccurs="0"/>
        <xsd:element ref="DigitalUncompressedOutput" minOccurs="0"/>
        <xsd:element ref="Redistribution" minOccurs="0"/>
        <xsd:element ref="Playback" minOccurs="0"/>
        <xsd:element ref="MulticastLimit" minOccurs="0"/>
        <xsd:element ref="Fingerprint" minOccurs="0" maxOccurs="unbounded"/>
        <xsd:element ref="DeviceCapabilities" minOccurs="0"/>
    </xsd:sequence>
    <xsd:attribute name="deviceBound" type="ShortBooleanType" use="optional" default="N"/>
    <xsd:attribute name="sharedMediaCopies" type="ShortBooleanType" use="optional" default="N">
        <xsd:annotation>
            <xsd:documentation>If Y, this content may be copied onto shared removable media that can be played in any device within the same authorized domain.  Note however that copies on shared media are not allowed when "deviceBound" attribute is Y.</xsd:documentation>
        </xsd:annotation>
    </xsd:attribute>
</xsd:complexType>
<xsd:complexType name="RenewalOptionType">
    <xsd:annotation>
```

```xml
<xsd:documentation>A set of rules that is used to renew a content license. May optionally be used as a set of rules for superdistribution.</xsd:documentation>
        </xsd:annotation>
        <xsd:sequence>
            <xsd:element name="RuleSet" type="StoredContentRuleSetType">
                <xsd:annotation>
                    <xsd:documentation>This set of rules for a renewal or superdistribution is incremental. For any optional persistent content rules/restrictions that are not listed here - try to copy those rules/restrictions first from the main set of persistence rules in the original license. If a particular rule or restriction is still not found, only then take the default value.</xsd:documentation>
                </xsd:annotation>
            </xsd:element>
            <xsd:element ref="OptionCost"/>
        </xsd:sequence>
        <xsd:attribute name="optionID" type="xsd:ID" use="required">
            <xsd:annotation>
                <xsd:documentation>Identification of an option that the customer wants to renew or purchase.</xsd:documentation>
            </xsd:annotation>
        </xsd:attribute>
        <xsd:attribute name="expiration" type="xsd:date" use="optional">
            <xsd:annotation>
                <xsd:documentation>This option cannot be renewed, purchased or re-distributed after this date.</xsd:documentation>
            </xsd:annotation>
        </xsd:attribute>
    </xsd:complexType>
    <xsd:complexType name="RentalType">
        <xsd:annotation>
            <xsd:documentation>Content rental period</xsd:documentation>
        </xsd:annotation>
        <xsd:choice>
            <xsd:element name="EndTime" type="xsd:dateTime" minOccurs="0">
```

```xml
            <xsd:annotation>
                <xsd:documentation>End time of the rental period.</xsd:documentation>
            </xsd:annotation>
        </xsd:element>
        <xsd:element name="Interval" minOccurs="0">
            <xsd:annotation>
                <xsd:documentation>If startOnFirstUse attribute is Y, start the rental period when content is first rendered.  Otherwise, start rental period as soon as the license is created or at the beginning of startDate time if in future.</xsd:documentation>
            </xsd:annotation>
            <xsd:complexType>
                <xsd:simpleContent>
                    <xsd:extension base="ShortDurationType">
                        <xsd:attribute name="startOnFirstUse" type="ShortBooleanType" use="optional" default="N"/>
                    </xsd:extension>
                </xsd:simpleContent>
            </xsd:complexType>
        </xsd:element>
    </xsd:choice>
</xsd:complexType>
<xsd:element name="Playback">
    <xsd:annotation>
        <xsd:documentation>Controls subsequent rendering of content. Start and end date attributes limit the content availability window. </xsd:documentation>
    </xsd:annotation>
    <xsd:complexType>
        <xsd:sequence>
            <xsd:element ref="PlayBackCount" minOccurs="0"/>
            <xsd:element ref="Rental" minOccurs="0"/>
            <xsd:element ref="PauseTime" minOccurs="0"/>
        </xsd:sequence>
        <xsd:attribute name="startDate" type="xsd:dateTime" use="optional"/>
```

```xml
            <xsd:attribute name="endDate" type="xsd:dateTime" use="optional"/>
        </xsd:complexType>
    </xsd:element>
    <xsd:element name="Redistribution">
        <xsd:annotation>
            <xsd:documentation>Retransmission beyond home domain. Disabled by default, unless this element is explicitly present.</xsd:documentation>
        </xsd:annotation>
        <xsd:complexType>
            <xsd:sequence>
                <xsd:element ref="Destination" minOccurs="0" maxOccurs="unbounded"/>
                <xsd:element ref="GeographicalRestriction" minOccurs="0"/>
            </xsd:sequence>
            <xsd:attribute name="contentOperation" type="ContentOperationType" use="optional" default="COPY">
                <xsd:annotation>
                    <xsd:documentation>If true, can only move content to the listed domains/devices. Must remove the previous copy after a move. If a list of domains/devices is not present, can move to any domain. If false, can copy to the listed domains/devices. If false and there is no list of devices/domains, the content cannot exit the initial domain.</xsd:documentation>
                </xsd:annotation>
            </xsd:attribute>
        </xsd:complexType>
    </xsd:element>
    <xsd:simpleType name="ContentOperationType">
        <xsd:annotation>
            <xsd:documentation>Defines how the content is to be consumed by a particular destination.</xsd:documentation>
        </xsd:annotation>
        <xsd:restriction base="xsd:NMTOKEN">
            <xsd:enumeration value="STREAM">
                <xsd:annotation>
```

```xml
            <xsd:documentation>This allows you to only stream the content to its destination. The
content may not be recorded, copied or moved.</xsd:documentation>
        </xsd:annotation>
    </xsd:enumeration>
    <xsd:enumeration value="MOVE">
        <xsd:annotation>
            <xsd:documentation>This allows you to either stream the content to its destination, or
move the content. A move means that as soon as a copy or recording of the content is made at the destination,
the original copy must be removed.</xsd:documentation>
        </xsd:annotation>
    </xsd:enumeration>
    <xsd:enumeration value="COPY">
        <xsd:annotation>
            <xsd:documentation>This allows the content to be streamed, recorded, moved or
copied to its destination.</xsd:documentation>
        </xsd:annotation>
    </xsd:enumeration>
</xsd:restriction>
</xsd:simpleType>
<xsd:element name="MulticastLimit">
    <xsd:annotation>
        <xsd:documentation>Limits the number of devices that the content can be simultaneously
streamed to.</xsd:documentation>
    </xsd:annotation>
    <xsd:complexType>
        <xsd:attribute name="Limit" use="required">
            <xsd:simpleType>
                <xsd:restriction base="xsd:short"/>
            </xsd:simpleType>
        </xsd:attribute>
    </xsd:complexType>
</xsd:element>
<xsd:element name="DeviceCapabilities" type="DeviceCapabilityType">
```

```xml
        <xsd:annotation>
            <xsd:documentation>Security requirements on any destination device that will handle a copy of this content.</xsd:documentation>
        </xsd:annotation>
    </xsd:element>
    <xsd:element name="Copyright" type="xsd:string">
        <xsd:annotation>
            <xsd:documentation>Copyright declaration</xsd:documentation>
        </xsd:annotation>
    </xsd:element>
    <xsd:element name="OptionCost">
        <xsd:annotation>
            <xsd:documentation>Pricing information associated with a set of persistence rules that could be used either for a license renewal or for superdistribution.</xsd:documentation>
        </xsd:annotation>
        <xsd:complexType>
            <xsd:complexContent>
                <xsd:extension base="CurrencyType">
                    <xsd:sequence>
                        <xsd:element ref="RenewalCost"/>
                        <xsd:element ref="SuperdistributionCost" minOccurs="0"/>
                    </xsd:sequence>
                </xsd:extension>
            </xsd:complexContent>
        </xsd:complexType>
    </xsd:element>
    <xsd:element name="RenewalCost" type="MoneyType">
        <xsd:annotation>
            <xsd:documentation>Cost of a license renewal</xsd:documentation>
        </xsd:annotation>
    </xsd:element>
    <xsd:element name="SuperdistributionCost" type="MoneyType">
        <xsd:annotation>
```

```
            <xsd:documentation>Cost of a redistributed copy of the content. If this attribute is not defined,
this particular set of persistence rules cannot be used for superdistribution.</xsd:documentation>
        </xsd:annotation>
    </xsd:element>
    <xsd:element name="RuleSet" type="StoredContentRuleSetType">
        <xsd:annotation>
            <xsd:documentation>Persistent content rules that apply to this copy of the purchased
content.</xsd:documentation>
        </xsd:annotation>
    </xsd:element>
    <xsd:element name="Destination" type="EntityType">
        <xsd:annotation>
            <xsd:documentation>Specifies a list of devices or domains the content where the can be
streamed, moved or copied to. If this list is missing, there are no restrictions on the destination devices or
domains.</xsd:documentation>
        </xsd:annotation>
    </xsd:element>
    <xsd:element name="PlayBackCount">
        <xsd:annotation>
            <xsd:documentation>The number of times that a recording of content may be played within the
availability window.</xsd:documentation>
        </xsd:annotation>
        <xsd:complexType>
            <xsd:simpleContent>
                <xsd:extension base="PlayBackCountType">
                    <xsd:attribute name="maxDuration" type="ShortDurationType" use="optional">
                        <xsd:annotation>
                            <xsd:documentation>Specifies how long the content can be active before a
new playcount is consumed.</xsd:documentation>
                        </xsd:annotation>
                    </xsd:attribute>
                </xsd:extension>
            </xsd:simpleContent>
```

```
        </xsd:complexType>

</xsd:element>

<xsd:element name="DelayedStart" type="xsd:dateTime">

<xsd:annotation>

<xsd:documentation>Start Time defines the starting date and time at which content may begin to be played and viewed. </xsd:documentation>

</xsd:annotation>

</xsd:element>

<xsd:element name="Rental" type="RentalType">

<xsd:annotation>

<xsd:documentation>Rental period is also restricted by the content availability window.</xsd:documentation>

</xsd:annotation>

</xsd:element>

<xsd:element name="GeographicalRestriction" type="BlackoutType">

<xsd:annotation>

<xsd:documentation>Geographical restrictions for content consumption in other authorized domains</xsd:documentation>

</xsd:annotation>

</xsd:element>

</xsd:schema>
```

Copy Protection Rules Schema

```
<?xml version="1.0" encoding="UTF-8"?>
<!-- edited with XMLSPY v5 rel. 3 U (http://www.xmlspy.com) by Alexander Medvinsky (Motorola BCS) -->
<!-- edited with XML Spy v4.1 U (http://www.xmlspy.com) by Petr Peterka (Motorola) -->
<xsd:schema targetNamespace="http://ppeterka1.w1.bcs.mot.com/xml" xmlns:xsd="http://www.w3.org/2001/XMLSchema" xmlns="http://ppeterka1.w1.bcs.mot.com/xml" elementFormDefault="unqualified" attributeFormDefault="unqualified" version="1.5">

<xsd:include schemaLocation="http://ppeterka1.w1.bcs.mot.com/xml/IPRM-CORE.xsd"/>
    <!--<xsd:include schemaLocation="C:/Documents and Settings/smedvins/My Documents/IPRM/XML/IPRM-CORE.xsd"/>-->
```

```xml
<xsd:notation name="IPRL-CP" public="http://ppeterka1.w1.bcs.mot.com/xml">
    <xsd:annotation>
        <xsd:documentation>IPRM Rights Management Language for copy protection rules for non-persistent content</xsd:documentation>
    </xsd:annotation>
</xsd:notation>
<xsd:element name="ForwardingLimit" type="xsd:integer" default="0">
    <xsd:annotation>
        <xsd:documentation>Limit on the number of simultaneous receivers to which content streams may be forwarded over IPRM-protected connections.</xsd:documentation>
    </xsd:annotation>
</xsd:element>
<xsd:element name="CopyProtectionRules" substitutionGroup="GenericRights">
    <xsd:annotation>
        <xsd:documentation>Copy protection rules for non-persistent content</xsd:documentation>
    </xsd:annotation>
    <xsd:complexType>
        <xsd:sequence>
            <xsd:element ref="AnalogOutput" minOccurs="0"/>
            <xsd:element ref="DigitalCompressedOutput" minOccurs="0"/>
            <xsd:element ref="DigitalUncompressedOutput" minOccurs="0"/>
            <xsd:element ref="ForwardingLimit" minOccurs="0"/>
            <xsd:element ref="PauseTime" minOccurs="0"/>
            <xsd:element ref="Fingerprint" minOccurs="0" maxOccurs="unbounded"/>
        </xsd:sequence>
    </xsd:complexType>
</xsd:element>
</xsd:schema>
```

Default Name Space

The IPRM XML Schema must be the default namespace in any XML document provided as an input to the IPRM system.

EXAMPLES

The following provides an example of Session Rights and Authorization XML documents.

Session Rights Example

The following example represents content with the following rules:
It is blacked out in all countries except in USA;
It can be purchased if the user would be otherwise blacked out;
It is available for subscription on CNN/NEWS;
The cost is:
 $2.99 for one-time-pay or
 $0.99 for subscribers;
Client device is not required to have any hardware or software security (security level 1);
Rating is TV-14 using a TV Rating scale.
The user selection indicates that the user:
Chose to pay for the content using a one-time-pay option;
Overrode the parental rating (of TV-14).
This particular user selected the subscription option and he overrode the rating rule.

Has a large personal network (connected with VPNs), where the access point is located in the United States but there are additional devices in the same network located in the UK and New Zeland;
Highest TV rating level allowed is TV-14;
Highest MPAA rating level allowed is PG-13;
Has SW-level security, as indicated in the device certificate and in the corresponding ESBroker ticket.

As a result the user may be granted access to the content since he:
Is capable of paying a one-time charge for the content;
The access point does not fall into the blackout area and the content can only be consumed by the access device;
Only a minimum security level (no hardware or software security) is required to access this content;
Overrode his rating ceiling which would otherwise prevented him from watching the content.

Copy Protection Rules Example

In the following example:
Analog output:
 May not be copied
 Cannot be component output
 MACROVISION is turned on with pseudo-sync pulse and a 4-line split color burst

```
<?xml version="1.0" encoding="UTF-8"?>
<!-- edited with XMLSPY v5 rel. 3 U (http://www.xmlspy.com) by Alexander Medvinsky (Motorola BCS) -->
<!--Sample XML file generated by XMLSPY v5 rel. 3 U (http://www.xmlspy.com)-->
<n:Rights xmlns:n="http://ppeterka1.w1.bcs.mot.com/xml"
xmlns:xsi="http://www.w3.org/2001/XMLSchema-instance"
xsi:schemaLocation="http://ppeterka1.w1.bcs.mot.com/xml
    C:\DOCUME~1\smedvins\MYDOCU~1\IPRM\XML\IPRM-SRO.xsd">
    <n:Content format="URI" id="RTSP://movies.abs.com/myMovie.mp4" protected="Y">My favorite movie</n:Content>
        <n:Provider pid="4096">Comcast</n:Provider>
        <n:Rule extern="false">
            <n:PurchaseOption optionID="ID000000">
                <n:GenericRights/>
                <n:Cost currency="USD" format="ISO4217">
                    <n:OneTimePay price="2.99"/>
                </n:Cost>
                <n:SubscriptionName provider="CNN">NEWS</n:SubscriptionName>
                <n:IncrementalCost currency="USD" format="ISO4217" price="0.99"/>
            </n:PurchaseOption>
            <n:Blackout xsi:type="CountryLocation" restriction="OUT" buyThru="false">
                <n:Country format="ISO3166">US</n:Country>
            </n:Blackout>
            <n:TvRating>TV-14</n:TvRating>
            <n:DeviceCapabilities securityLevelToRender="1"/>
        </n:Rule>
        <n:Selection extern="false" optionID="ID000000" deviceBound="Y">
            <n:Payment>ONE-TIME-PAY</n:Payment>
            <n:Override>RATING</n:Override>
        </n:Selection>
</n:Rights>
```

Authorization Data Example

This user identified as "uniqueuser" can:
Receive free content;
Pay for PPV and PBT content;
Access subscription content from provider 0001 on service 1234;

Video image over analog output must be constrained, where the resolution of a constrained image is device-dependent.

Audio output bit rate is not constrained, but the number of audio channels are limited to 2 (stereo).
Digital compressed output is allowed and only a single copy may be made.

Digital uncompressed output is allowed but may not be copied.

This content cannot be forwarded downstream of the access device.

The maximum pause time allowed during the consumption of this content is 90 minutes.

During each play back, the maximum pause time per occasion is 90 minutes.

As the content is being rendered and output to a digital or analog port, it must be fingerprinted using algorithm ID 123 or 124.

```xml
<?xml version="1.0" encoding="UTF-8"?>
<n:CopyProtectionRules xmlns:n="http://ppeterka1.w1.bcs.mot.com/xml"
   xmlns:xsi="http://www.w3.org/2001/XMLSchema-instance"
   xsi:schemaLocation="http://ppeterka1.w1.bcs.mot.com/xml
       C:\DOCUME~1\smedvins\MYDOCU~1\IPRM\XML\IPRM-CP.xsd">
   <n:AnalogOutput copyRestriction="NOCOPY" componentOutput="Y" outputAllowed="Y"
      pseudoSyncPulse="Y" splitColorBurst="4" constrainedImage="1" constrainedAudio="0"
      audioChannelLimit="2"/>
   <n:DigitalCompressedOutput copyRestriction="ONEGENERATION" outputAllowed="Y"/>
   <n:DigitalUncompressedOutput copyRestriction="NOCOPY" outputAllowed="Y"/>
   <n:ForwardingLimit>0</n:ForwardingLimit>
   <n:PauseTime>PT1H30M</n:PauseTime>
</n:CopyProtectionRules>
```

Persistent Entitlements Example

In the following example:

Analog output, digital compressed output and digital uncompressed output are all constrained the same way as in the Copy Protection Rules example (section 5.3).

The content cannot be shared outside of the access device and cannot be streamed, moved or copied to any other user's authorized domain.

A persistent copy of this content is valid only within the period from midnight of Jan. 1st, 2003 until the midnight of Dec. 31, 2003.

A persistent copy of the content may be played back only two times and each play back cannot be longer than 12 hours.

The device that is rendering or saving a copy of this content is not required to have any physical security.

This content may be renewed for $2.99 for an additional 3-day rental that starts when the content is first rendered.

This content can also be super-distributed for $3.99, also as a 3-day rental that starts when the content is first rendered.

This content has the following copyright notice that needs to be carried with the content license: "Motorola, Inc. 2003"

```xml
<?xml version="1.0" encoding="UTF-8"?>
<!--Sample XML file generated by XMLSPY v5 rel. 3 U (http://www.xmlspy.com)-->
<n:PersistentEntitlements xmlns:n="http://ppeterka1.w1.bcs.mot.com/xml"
   xmlns:xsi="http://www.w3.org/2001/XMLSchema-instance"
   xsi:schemaLocation="http://ppeterka1.w1.bcs.mot.com/xml
       C:\DOCUME~1\smedvins\MYDOCU~1\IPRM\XML\IPRM-PR.xsd" renewal="Y"
   superdistribution="Y">
       <n:RuleSet deviceBound="Y">
           <n:AnalogOutput copyRestriction="NOCOPY" componentOutput="Y" outputAllowed="Y"
      pseudoSyncPulse="Y" splitColorBurst="4" constrainedImage="1" constrainedAudio="0"
      audioChannelLimit="2"/>
           <n:DigitalCompressedOutput copyRestriction="ONEGENERATION"
   outputAllowed="Y"/>
           <n:DigitalUncompressedOutput copyRestriction="NOCOPY" outputAllowed="Y"/>
           <n:Playback startDate="2003-01-01T00:00:00" endDate="2003-12-31T00:00:00">
               <n:PlayBackCount maxDuration="PT12H">2</n:PlayBackCount>
               <n:PauseTime>PT1H30M</n:PauseTime>
           </n:Playback>
           <n:Fingerprint fingerprintID="123"/>
           <n:Fingerprint fingerprintID="124"/>
           <n:DeviceCapabilities securityLevelToRender="1" securityLevelToCopy="1"
   codecInSecureHW="N" watermarkInSecureHW="N" fingerprintInSecureHW="N"/>
       </n:RuleSet>
       <RenewalOption optionID="ID000001" expiration="2004-01-01">
           <RuleSet deviceBound="Y">
               <n:Playback>
                   <n:Rental>
                       <Interval startOnFirstUse="Y">P3D</Interval>
                   </n:Rental>
               </n:Playback>
           </RuleSet>
```

-continued

```
<n:OptionCost currency="USD" format="ISO4217">
    <n:RenewalCost>2.99</n:RenewalCost>
    <n:SuperdistributionCost>3.99</n:SuperdistributionCost>
  </n:OptionCost>
</RenewalOption>
<n:Copyright>Motorola, Inc. 2003</n:Copyright>
</n:PersistentEntitlements>
```

Figure 15:
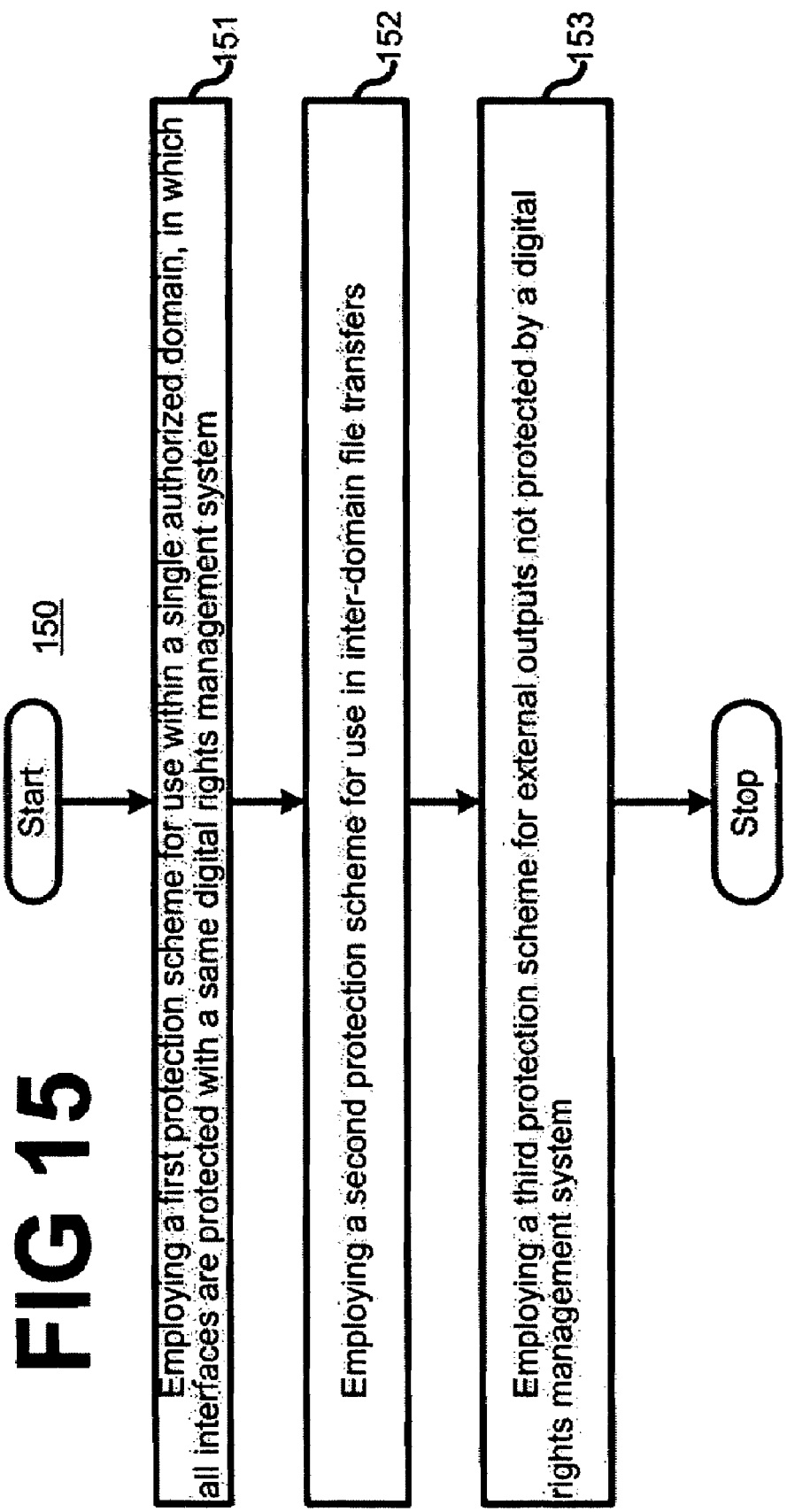
FIG. 15 depicts an exemplary embodiment of a copyright protection method for files according to one aspect of the present invention.

Turning to FIG. 15, shown therein is a copyright protection method 150 for one or more files according to another aspect of the present invention. This method can be employed in any situation in which intra-domain transfers or copy operations are desired as well as inter-domain transfers or copy operations. Moreover, the exemplary embodiment 150 can be employed where outputs from the system are not controlled by a digital rights management system.

In element 151, the exemplary embodiment 150 employs a first protection scheme (such as element 160, see FIG. 16) for use within a single authorized domain, in which all interfaces are protected with a same digital rights management system.

In element 152, the exemplary embodiment 150 employs a second protection scheme (such as element 170, see FIG. 17) for use in inter-domain file transfers.

In element 153, the exemplary embodiment 150 employs a third protection scheme (such as element 180, see FIG. 18) for external outputs not protected by a digital rights management system.

Figure 16:
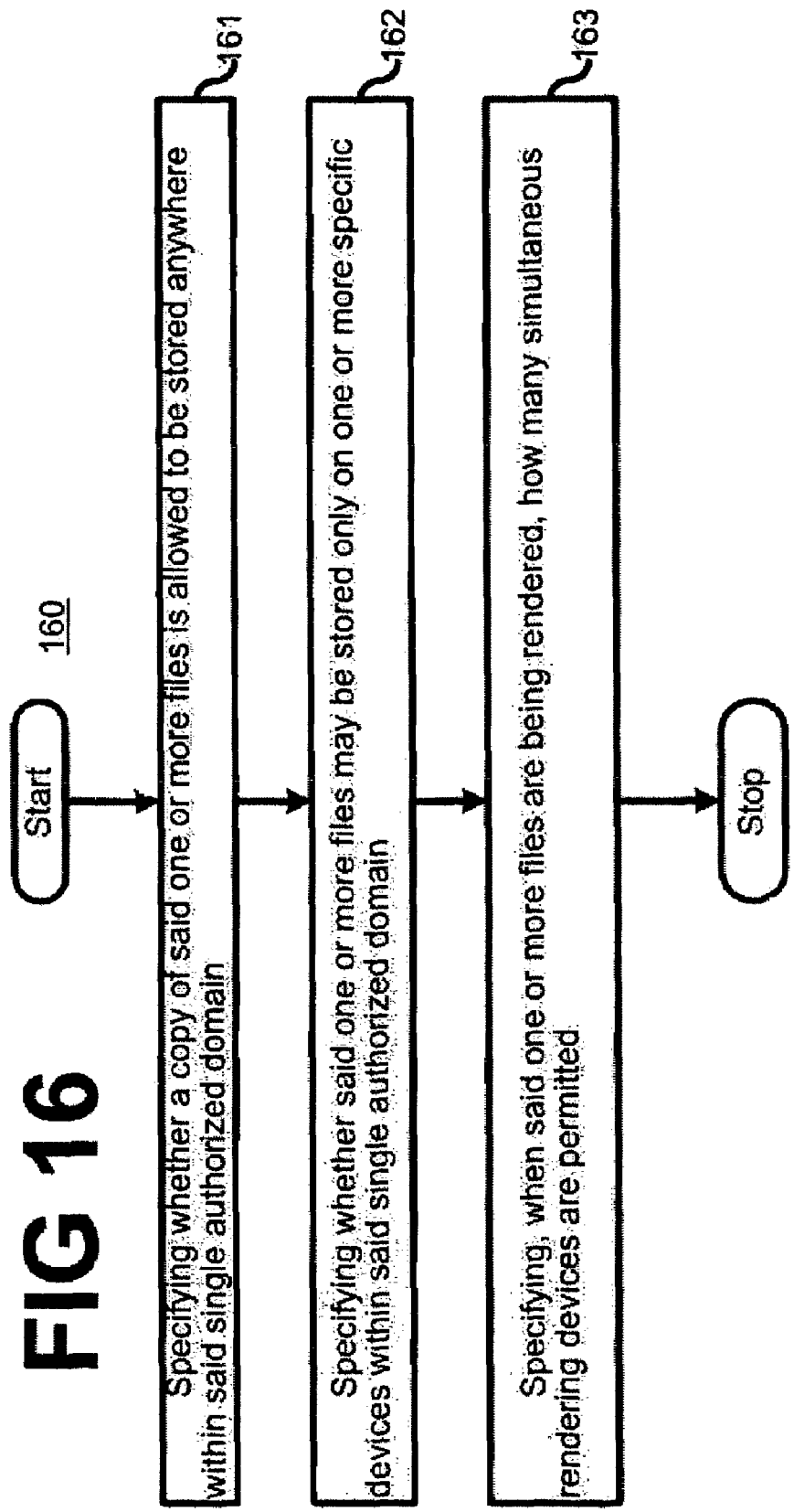
FIG. 16 depicts an exemplary embodiment of a first protection scheme employed in the method shown in FIG. 15 according to another aspect of the present invention.

Turning to FIG. 16, shown therein is an exemplary embodiment 160 of a first protection scheme according to yet another aspect of the present invention, which first protection scheme may be employed in exemplary embodiment 150.

In element 161, the exemplary embodiment 160 specifies whether a copy of the one or more files is allowed to be stored anywhere within the single authorized domain.

In element 162, the exemplary embodiment 160 specifies whether the one or more files may be stored only on one or more specific devices within the single authorized domain.

In element 163, the exemplary embodiment 160 specifies, when one or more files are being rendered, how many simultaneous rendering devices are permitted.

Figure 17:
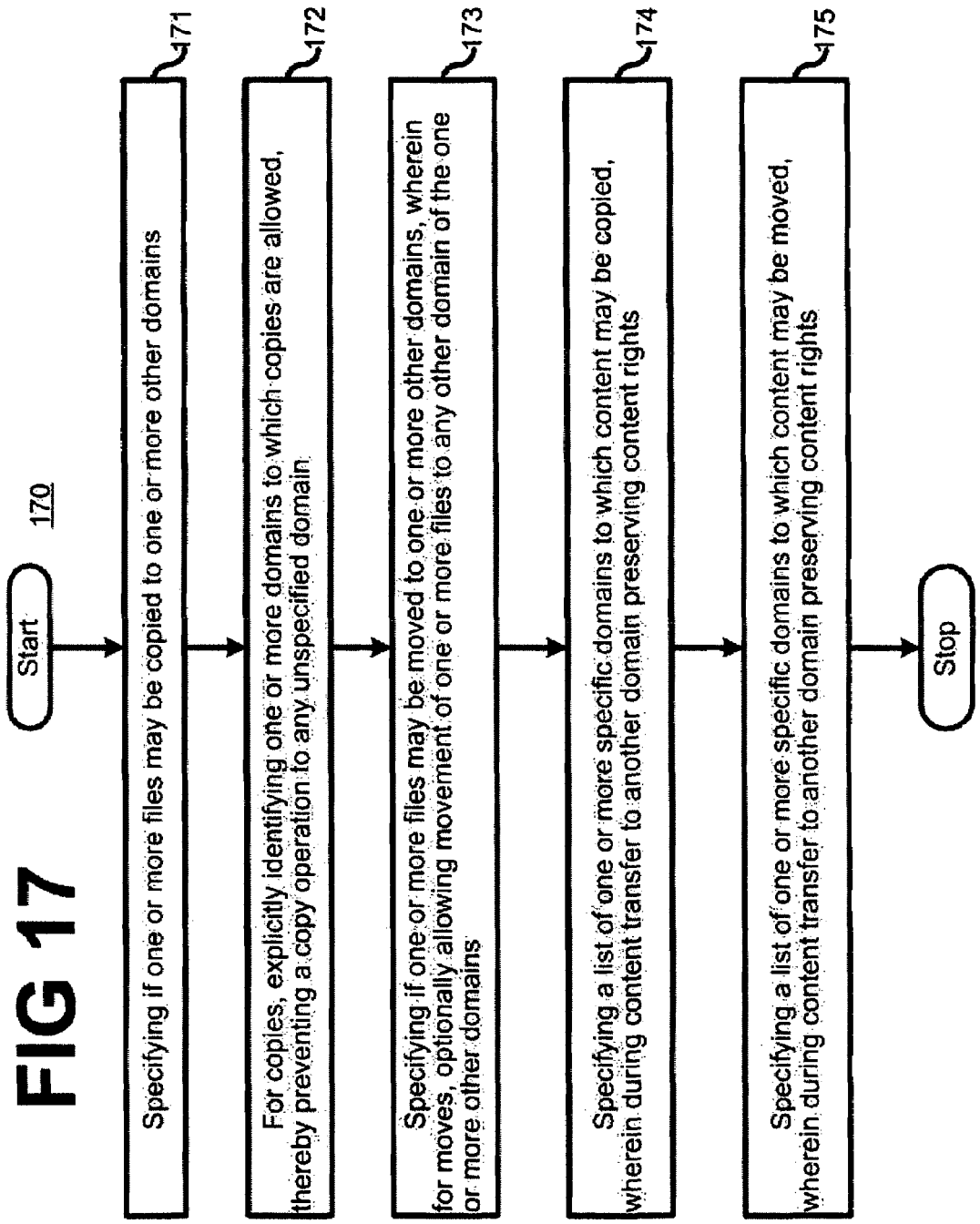
FIG. 17 depicts an exemplary embodiment of a second protection scheme employed in the method shown in FIG. 15 according to still another aspect of the present invention.

Turning to FIG. 17, shown therein is an exemplary embodiment 170 of a second protection scheme, which may be employed in exemplary embodiment 150 according to still another aspect of the present invention.

In element 171, the exemplary embodiment 170 specifies if one or more files may be copied to one or more other domains.

In element 172, the exemplary embodiment 170, for copies, explicitly identifies one or more domains to which the copies are allowed, thereby preventing a copy operation to any unspecified domain.

In element 173, the exemplary embodiment 170 specifies if one or more files may be moved to one or more other domains, wherein for moves, optionally allowing movement of said one or more files to any other domain of said one or more other domains.

In element 174, the exemplary embodiment 170 specifies a list of one or more specific domains to which content may be copied, wherein during content transfer to another domain preserving content rights.

In element 175, the exemplary embodiment 170 specifies a list of one or more specific domains to which content may be moved, wherein during content transfer to another domain preserving content rights.

Figure 18:
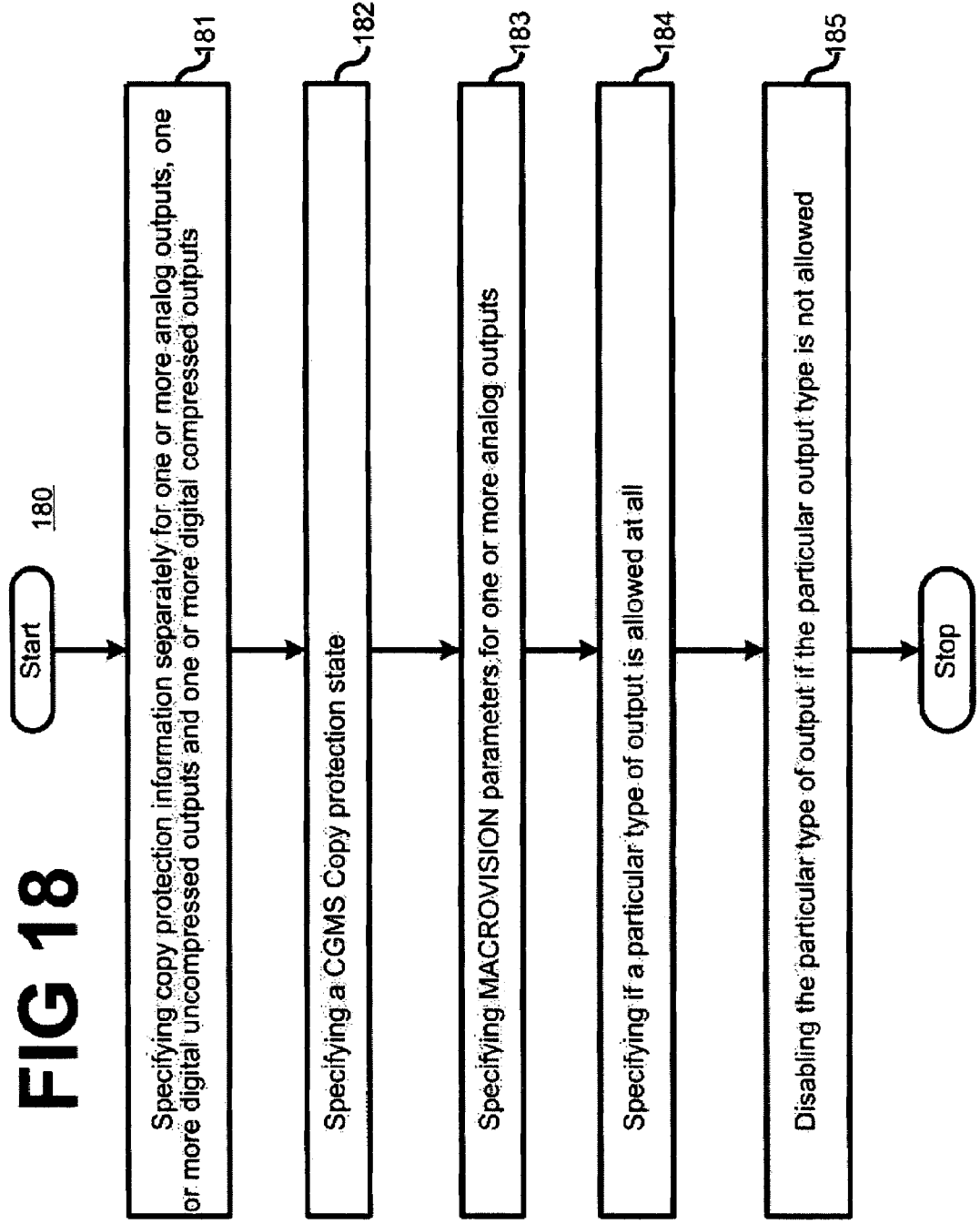
FIG. 18 depicts an exemplary embodiment of a third protection scheme that may be employed in the method shown in FIG. 15 according to yet another aspect of the present invention.

Turning to FIG. 18, shown therein is an exemplary embodiment 180 of a third protection scheme, which may be employed in exemplary embodiment 180 according to yet another aspect of the present invention.

In element 181, the exemplary embodiment 180 specifies copy protection information separately for one or more analog outputs, one or more digital uncompressed outputs and one or more digital compressed outputs.

In element 182, the exemplary embodiment 180 specifies a CGMS Copy protection state.

In element 183, the exemplary embodiment 180 specifies MACROVISION parameters for one or more analog outputs.

In element 184, the exemplary embodiment 180 specifies if a particular type of output is allowed at all.

In element 185, the exemplary embodiment disables the particular type of output if the particular output type is not allowed.

Figure 19:
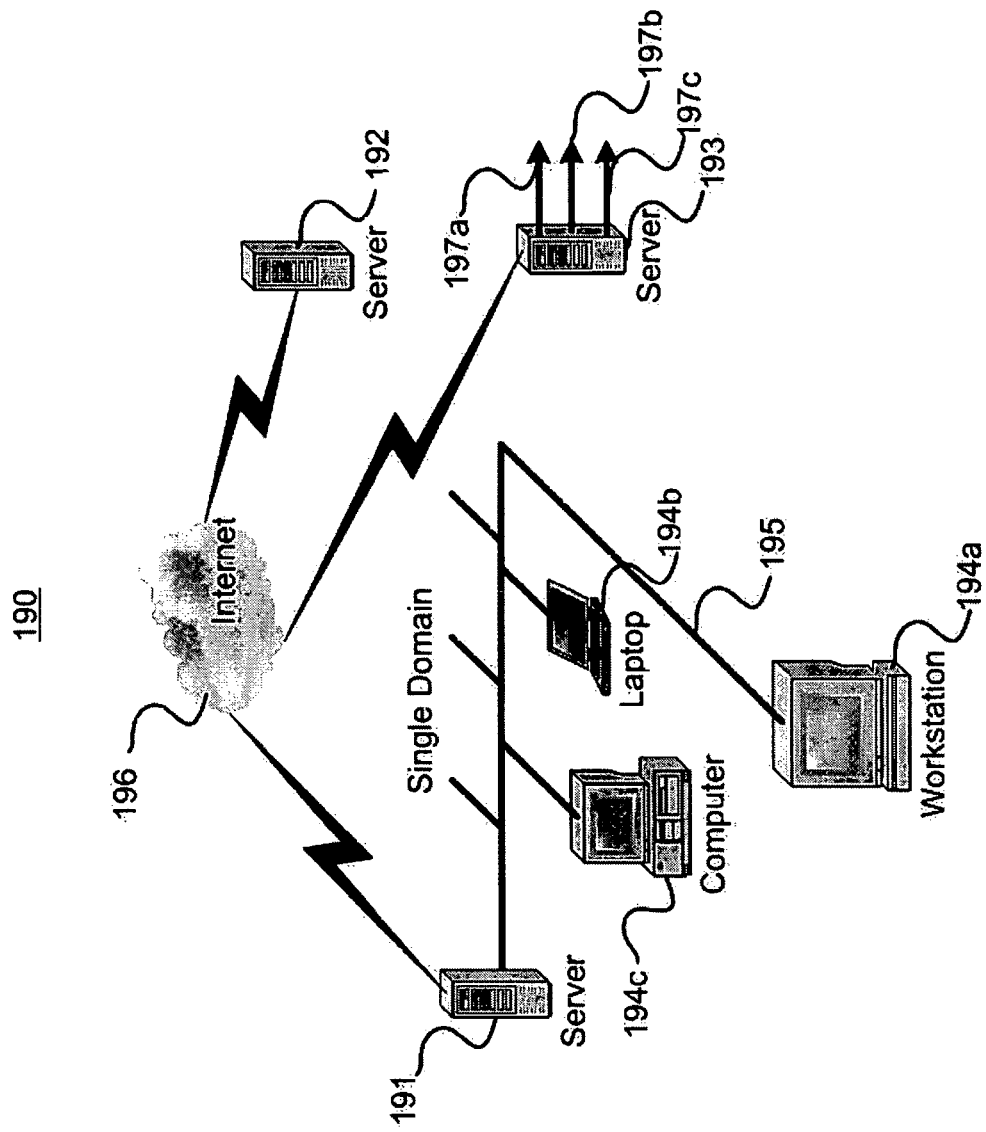
FIG. 19 depicts an exemplary embodiment of an apparatus in which the method shown in FIG. 15 may be employed according to another aspect of the present invention.

Turning to FIG. 19, shown therein is an apparatus 190 for copyright protection for one or more files. The apparatus includes a first processor 191, such as a server, coupled via a network 195, such as a local area network, to various interfaces 194a-c, such as a workstation 194a, a laptop 194b and a computer 194c. The server 191 is also coupled to another server or processor 192 via the Internet 196 or other computer network. The local area network 195 is an example of a single domain. Servers 191-192 are also coupled to another server or processor 193, which includes several outputs 197a-c.

The first processor or server 191 employs a first protection scheme, such as exemplary embodiment 160 shown in FIG. 16, for use within the single authorized domain 195 (e.g., the local area network in this case), in which all interfaces 194a-c are protected with a same digital rights management system.

The second processor or server 192 employing a second protection scheme, such as exemplary embodiment 170 for use in inter-domain file transfers, such as transfers from server 192 to server 193.

The third processor or server 193 employs a third protection scheme, such as exemplary embodiment 180 shown in FIG. 18, for external outputs 197a-c not protected by a digital rights management system.

Figure 20:
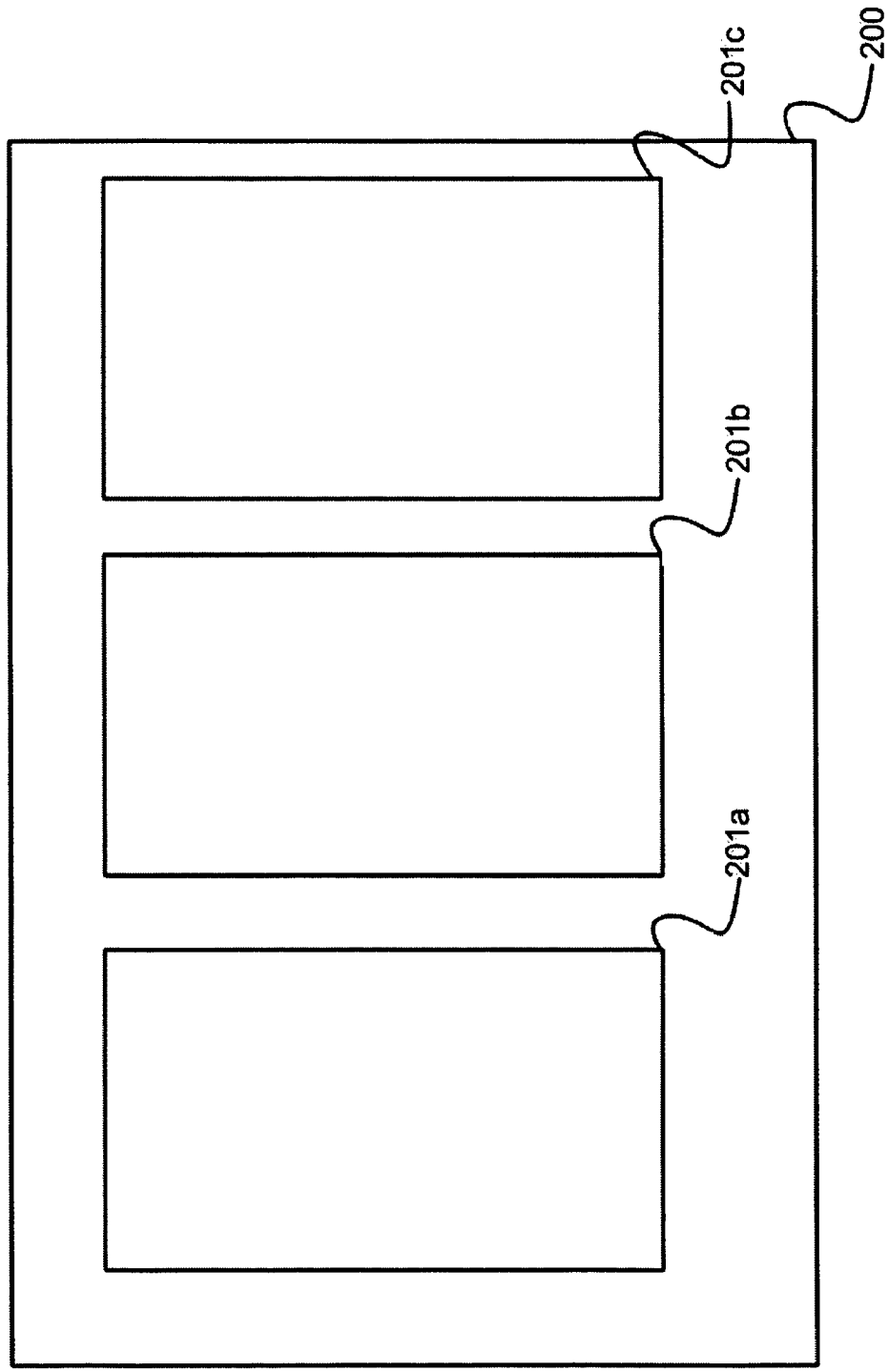
FIG. 20 depicts an exemplary embodiment of a computer readable media in which the method shown in FIG. 15 may be employed according to another aspect of the present invention.

Turning to FIG. 20, shown therein is an exemplary embodiment of a computer readable medium 200 having stored therein instructions causing a processor, such as servers 191-193, to implement a copyright protection method, such as exemplary embodiment 150 for one or more files.

The exemplary embodiment 200 includes a first section 201a storing instructions causing a first processor to employ a first protection scheme, such as exemplary embodiment 160 for use within a single authorized domain, such as local area network 195, in which all interfaces, such as computers 194a-c, are protected with a same digital rights management system.

The exemplary embodiment 200 includes a second section 201b storing instructions causing a second processor to employ a second protection scheme, such as exemplary embodiment 170 for use in inter-domain file transfers.

The exemplary embodiment 200 may include a third section 201c storing instructions causing a third processor to employing a third protection scheme, such as exemplary embodiment 180 for external outputs, such as analog outputs 197a, digital compressed outputs 197b and uncompressed digital outputs 197c, which are not protected by a digital rights management system.

The first, second and third processors shown in FIG. 19 may be the same processor executing two or three different processes, or two processors executing three processes between them.

Moreover, the computer readable medium may be distributed amongst separate devices so that one or more processors can execute each of the sections 201a-c. The computer readable media comprises any media capable of storing instructions to be read by a processor, such as magnetic, optic or other media. Examples include ROM, RAM, EEPROM, EPROM, CD-ROM, DVD, magnetic disks, optical disks, magnetic tapes, magnetic sticks, organic memory, etc.

Processors 191-193 comprise standard processors capable of executing the instructions set forth herein, such as standard servers, computers, or electronic devices.

Although various embodiments are specifically illustrated and described herein, it will be appreciated that modifications and variations of the invention are covered by the above teachings and are within the purview of the appended claims without departing from the spirit and intended scope of the invention. For example, certain exemplary embodiments of protection schemes are set forth, however, others may suffice. Furthermore, these examples should not be interpreted to limit the modifications and variations of the invention covered by the claims but are merely illustrative of possible variations.

What is claimed is:

1. A copyright protection method (150) for one or more files comprising:
   storing said one or more files on at least one computer;
   employing (151) a first protection scheme for use within a single authorized domain, in which all interfaces are protected with a same digital rights management system;
   employing (152) a second protection scheme for use in inter-domain file transfers; and
   employing (153) a third protection scheme for external outputs not protected by a digital rights management system, wherein said third protection scheme includes one or more of:
   specifying copy protection information separately for one or more analog outputs, one or more digital uncompressed outputs and one or more digital compressed outputs;
   specifying a CGMS (Copy Generation Management System) Copy protection state;
   specifying MACROVISION parameters for one or more analog outputs; and
   specifying if a particular type of output is allowed at all, and disabling the particular type of output if the particular output type is not allowed.

2. The (150) method according to claim 1, wherein said first protection scheme (160) includes:
   specifying (161) whether a copy of said one or more files is allowed to be stored anywhere within said single authorized domain.

3. The method (150) according to claim 1, wherein said first protection scheme (160) includes:
   specifying (162) whether said one or more files may be stored only on one or more specific devices within said single authorized domain.

4. The method (150) according to claim 1, wherein said first protection scheme (160) includes:
   specifying (163), when said one or more files are being rendered, how many simultaneous rendering devices are permitted.

5. The method (150) according to claim 1, wherein said second protection scheme (170) includes:
   specifying (171) if the one or more files may be copied to one or more other domains.

6. The method (150) according to claim 5, wherein said second protection scheme (170) further comprises, for copies, explicitly identifying (172) one or more domains to which said copies are allowed, thereby preventing a copy operation to any unspecified domain.

7. The method (150) according to claim 1, wherein said second protection scheme (170) includes:
   specifying (173) if the one or more files may be moved to one or more other domains, wherein for moves, optionally allowing movement of said one or more files to any other domain of said one or more other domains.

8. The method (150) according to claim 1, wherein said second protection scheme (170) includes:
   specifying (174) a list of one or more specific domains to which content may be copied, wherein during content transfer to another domain preserving content rights.

9. The method (150) according to claim 1, wherein said second protection (170) scheme includes:
   specifying (175) a list of one or more specific domains to which content may be moved, wherein during content transfer to another domain preserving content rights.

10. An apparatus (190) for copyright protection for one or more files comprising:
    a first processor (191) employing a first protection scheme (160) for use within a single authorized domain (195), in which all interfaces (194a-c) are protected with a same digital rights management system;
    a second processor (192) employing a second protection scheme (170) for use in inter-domain file transfers; and
    a third processor employing a third protection scheme for external outputs not protected by a digital rights management system, wherein said third protection scheme includes one or more of:
    specifying copy protection information separately for one or more analog outputs, one or more digital uncompressed outputs and one or more digital compressed outputs;
    specifying a CGMS (Copy Generation Management System) Copy protection state;
    specifying MACROVISION parameters for one or more analog outputs; and
    specifying if a particular type of output is allowed at all, and disabling the particular type of output if the particular output type is not allowed.

11. The apparatus (190) according to claim 10, wherein said first protection scheme (160) includes:
    specifying (161) whether a copy of said one or more files is allowed to be stored anywhere within said single authorized domain;
    specifying (162) whether said one or more files may be stored only on one or more specific devices within said single authorized domain; and
    specifying (163), when said one or more files are being rendered, how many simultaneous rendering devices are permitted.

12. The apparatus (190) according to claim 11, wherein said second protection scheme (170) includes:
- specifying (171) if the one or more files may be copied to one or more other domains, wherein, for copies, explicitly identifying (172) one or more domains to which said copies are allowed, thereby preventing a copy operation to any unspecified domain;
- specifying (173) if the one or more files may be moved to one or more other domains, wherein for moves, optionally allowing movement of said one or more files to any other domain of said one or more other domains;
- specifying (174) a list of one or more specific domains to which content may be copied, wherein during content transfer to another domain preserving content rights; and
- specifying (175) a list of one or more specific domains to which content may be moved, wherein during content transfer to another domain preserving content rights.

13. A computer readable medium (200) having stored therein instructions causing a processor (191-193) to implement a copyright protection method (150) for one or more files comprising:
- employing a first protection scheme (160) for use within a single authorized domain (195), in which all interfaces (194a-c) are protected with a same digital rights management system;
- employing a second protection scheme (170) for use in inter-domain file transfers; and
- employing a third protection scheme (180) for external outputs (197a-c) not protected by a digital rights management system;
- wherein said first protection scheme (160) includes:
- specifying (161) whether a copy of said one or more files is allowed to be stored anywhere within said single authorized domain;
- specifying (162) whether said one or more files may be stored only on one or more specific devices within said single authorized domain; and
- specifying (163), when said one or more files are being rendered, how many simultaneous rendering devices are permitted; wherein said second protection scheme (170) includes:
- specifying (171) if the one or more files may be copied to one or more other domains, wherein, for copies, explicitly identifying (172) one or more domains to which said copies are allowed, thereby preventing a copy operation to any unspecified domain;
- specifying (173) if the one or more files may be moved to one or more other domains, wherein for moves, optionally allowing movement of said one or more files to any other domain of said one or more other domains;
- specifying (174) a list of one or more specific domains to which content may be copied, wherein during content transfer to another domain preserving content rights; and
- specifying (175) a list of one or more specific domains to which content may be moved, wherein during content transfer to another domain preserving content rights; and wherein said third protection scheme (180) includes:
- specifying (181) copy protection information separately for one or more analog outputs (197a), one or more digital uncompressed outputs (197b) and one or more digital compressed outputs (197c);
- specifying (182) a CGMS (Copy Generation Management System) Copy protection state;
- specifying (183) MACROVISION parameters for one or more analog outputs (197a);
- specifying (184) if a particular type of output is allowed at all; and
- disabling (185) the particular type of output if the particular output type is not allowed.

* * * * *